(12) United States Patent
VanLoocke et al.

(10) Patent No.: US 9,487,333 B2
(45) Date of Patent: Nov. 8, 2016

(54) PACKAGING FOR STEAMING AND RELATED METHODS

(71) Applicant: EXOPACK, LLC, Spartanburg, SC (US)

(72) Inventors: Cory VanLoocke, Spartanburg, SC (US); Dave McKnight, Spartanburg, SC (US); Tim Kieny, Spartanburg, SC (US); S. Cory Blanton, Spartanburg, SC (US); Connie Thompson-Kuhn, Spartanburg, SC (US); Melania Craddock, Spartanburg, SC (US); Josh Ball, Spartanburg, SC (US); Susan Elles, Spartanburg, SC (US); Sherry Comer, Spartanburg, SC (US); David Brian Long, Spartanburg, SC (US)

(73) Assignee: COVERIS FLEXIBLES US LLC, Chicago, IL (US)

( * ) Notice: Subject to any disclaimer, the term of this patent is extended or adjusted under 35 U.S.C. 154(b) by 0 days.

(21) Appl. No.: 13/677,043

(22) Filed: Nov. 14, 2012

(65) Prior Publication Data
US 2013/0071047 A1 Mar. 21, 2013

Related U.S. Application Data

(63) Continuation-in-part of application No. 13/320,064, filed as application No. PCT/US2011/054778 on Oct. 4, 2011.

(60) Provisional application No. 61/559,621, filed on Nov. 14, 2011, provisional application No. 61/389,558, filed on Oct. 4, 2010.

(51) Int. Cl.
*B65D 33/16* (2006.01)
*B65B 7/00* (2006.01)
(Continued)

(52) U.S. Cl.
CPC .............. *B65D 33/16* (2013.01); *A44B 19/285* (2013.01); *B65B 7/00* (2013.01); *B65D 31/10* (2013.01);
(Continued)

(58) Field of Classification Search
CPC .......... B65D 33/2541; B65D 2313/02; B65D 33/01
USPC ............... 383/95, 120, 61.1, 61.2, 203, 204; 24/442–452, DIG. 38, DIG. 41, DIG. 42, 24/DIG. 43
See application file for complete search history.

(56) References Cited

U.S. PATENT DOCUMENTS 6,202,260 B1 * 3/2001 Clune et al. ............... 24/30.5 R
6,656,403 B1 * 12/2003 Clune et al. ................. 264/167
(Continued)

FOREIGN PATENT DOCUMENTS

EP 1930252 6/2008
FR 2816597 5/2002
(Continued)

OTHER PUBLICATIONS

Notification of Transmittal of the International Search Report and the Written Opinion of the International Searching Authority mailed May 4, 2012 in International Application No. PCT/US2011/054778.
(Continued)

*Primary Examiner* — Jes F Pascua
(74) *Attorney, Agent, or Firm* — Stoel Rives LLP

(57) ABSTRACT

A strainable bag with a hook-and-hook closure can include walls formed of a material having multiple layers of polymer or paper or mixtures thereof, and which can include at least one gusset. The hook-and-hook closure allows for liquids or gases to be vented from the bag, as well as for liquids to be removed from the bag interior. The bag can be formed into a full open mouth configuration for ease of filling and ease of dispensing product. The hook-and-hook closure also allows for an imprecise alignment of the closure track to substantially close the bag around the gusset area. Methods of using and manufacturing a strainable bag with a hook-and-hook closure for preparing various food products are also presented.

30 Claims, 20 Drawing Sheets

(51) Int. Cl.
B65D 30/20 (2006.01)
B65D 33/22 (2006.01)
B65D 33/25 (2006.01)
A44B 19/28 (2006.01)
B65D 81/34 (2006.01)

(52) U.S. Cl.
CPC ............... *B65D 33/22* (2013.01); *B65D 33/25* (2013.01); *B65D 33/2508* (2013.01); *B65D 33/2591* (2013.01); *B65D 81/3461* (2013.01); *B65D 2313/02* (2013.01)

(56) References Cited

U.S. PATENT DOCUMENTS

| | | | |
|---|---|---|---|
| 6,991,375 | B2 | 1/2006 | Clune et al. |
| 7,163,706 | B2 * | 1/2007 | Shepard et al. ............... 426/118 |
| 7,340,807 | B2 * | 3/2008 | Dais et al. ....................... 24/443 |
| 2002/0168120 | A1 | 11/2002 | Wessling et al. |
| 2006/0159372 | A1 | 7/2006 | Plourde et al. |
| 2006/0210201 | A1 | 9/2006 | Ackerman et al. |
| 2007/0104395 | A1 * | 5/2007 | Kinigakis et al. ............ 383/61.1 |
| 2007/0258665 | A1 | 11/2007 | Greco et al. |
| 2008/0131035 | A1 | 6/2008 | Rogers |
| 2009/0148081 | A1 | 6/2009 | Rogers |
| 2010/0135600 | A1 | 6/2010 | Ducauchuis et al. |
| 2011/0033138 | A1 | 2/2011 | Cameron et al. |
| 2012/0269469 | A1 | 10/2012 | Long et al. |
| 2013/0071047 | A1 * | 3/2013 | VanLoocke et al. ........... 383/95 |

FOREIGN PATENT DOCUMENTS

| | | | |
|---|---|---|---|
| FR | 2816597 A1 * | 5/2002 | ............ B65D 33/24 |
| JP | 2003-237804 | 8/2003 | |
| JP | 4386731 | 10/2009 | |
| KR | 10-2006-0024365 | 3/2006 | |
| WO | WO 2012/047896 | 4/2012 | |

OTHER PUBLICATIONS

Office Action mailed Sep. 5, 2013 in co-pending U.S. Appl. No. 13/320,064, now published as publication No. US 2012/0269469.
Amendment and Response to Office Action filed Mar. 5, 2014 in co-pending U.S. Appl. No. 13/320,064, now published as publication No. US 2012/0269469.
Final Office Action mailed Mar. 18, 2014 in co-pending U.S. Appl. No. 13/320,064, now published as publication No. US 2012/0269469.
Office Action mailed Oct. 9, 2014 in co-pending U.S. Appl. No. 13/320,064, now published as publication No. 2012/0269469
Final Office Action mailed Apr. 22, 2015 in co-pending U.S. Appl. No. 13/320,064, now published as publication No. 2012/0269469
Office Action mailed Sep. 24, 2015 in co-pending U.S. Appl. No. 13/320,064, now published as publication No. 2012/0269469

* cited by examiner

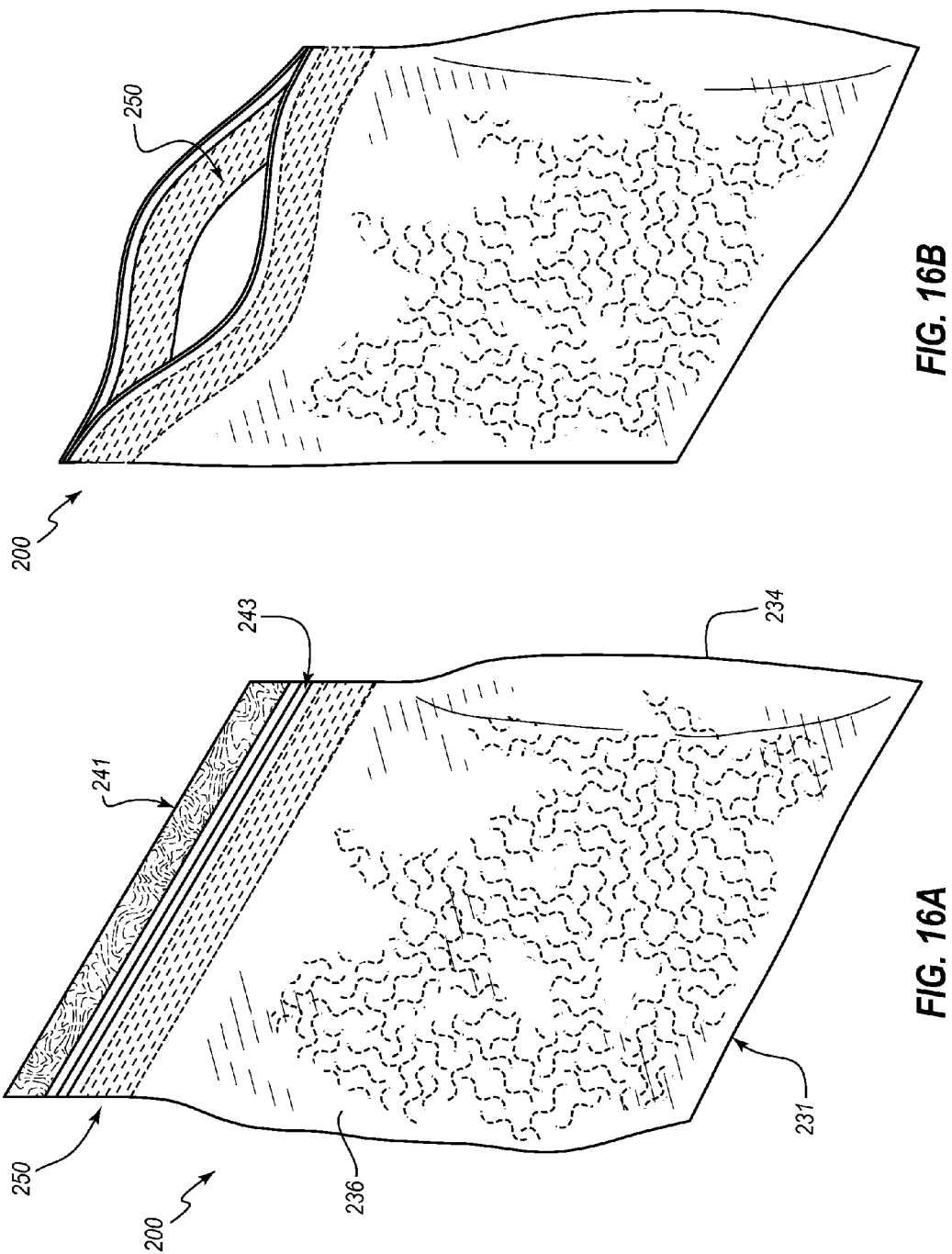

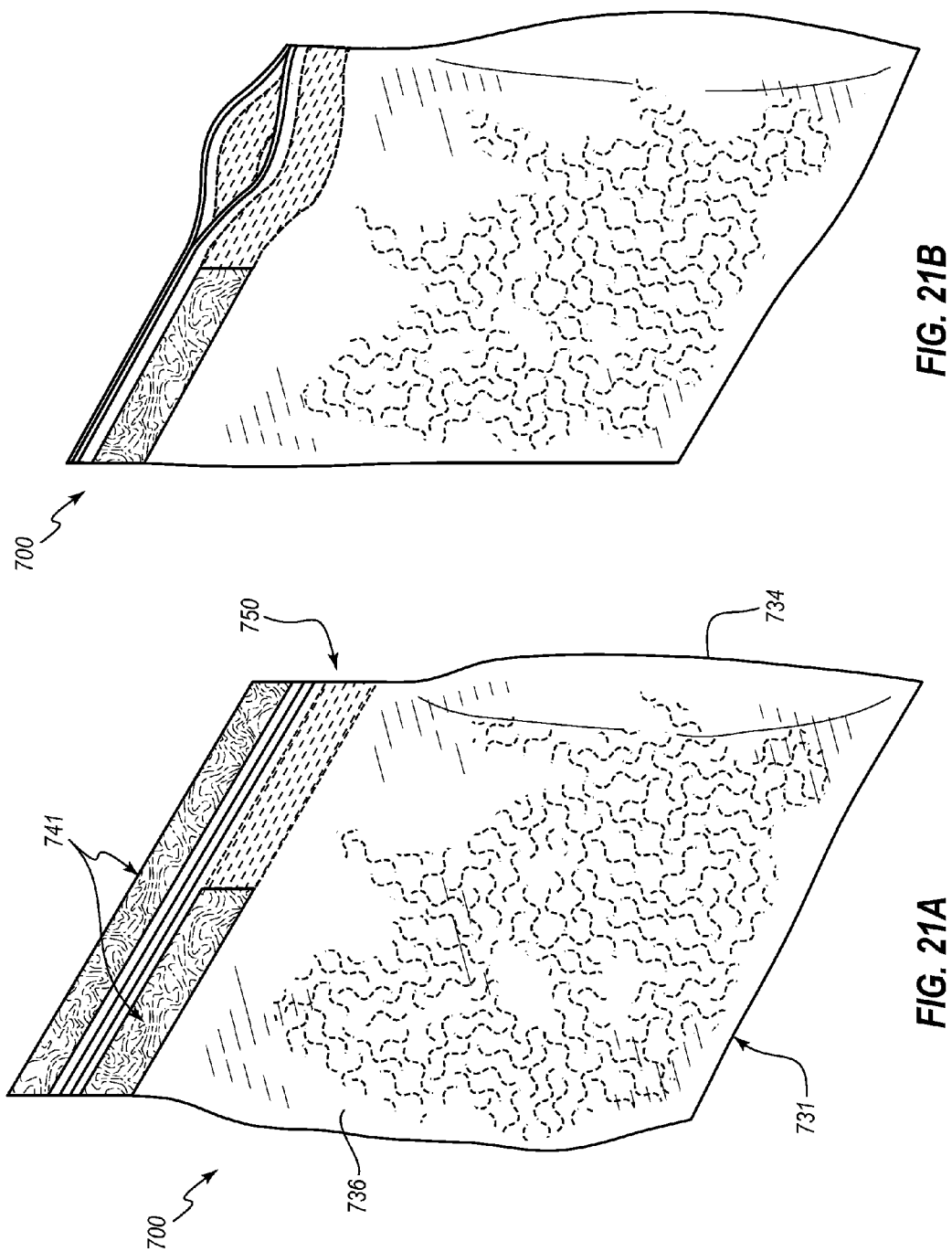

PACKAGING FOR STEAMING AND RELATED METHODS

CROSS-REFERENCE TO RELATED APPLICATIONS

This application claims priority to U.S. Provisional Patent Application No. 61/559,621 titled PACKAGING FOR STEAMING AND RELATED METHODS filed on Nov. 14, 2011. This application is a continuation-in-part of pending U.S. patent application Ser. No. 13/320,064, titled "RECLOSABLE FULL OPEN MOUTH BAG WITH A HOOK AND HOOK CLOSURE AND ASSOCIATED METHODS," which was filed on Nov. 11, 2011, which is the national stage entry of International Application No. PCT/US11/54778, titled "RECLOSABLE FULL OPEN MOUTH BAG WITH A HOOK AND HOOK CLOSURE AND ASSOCIATED METHODS," having an international filing date of Oct. 4, 2011, and thus claims priority thereto under 35 U.S.C. §365(c), which International Application is based on U.S. Provisional Patent Application No. 61/389,558, titled "RECLOSABLE FULL OPEN MOUTH BAG WITH A HOOK AND HOOK CLOSURE AND ASSOCIATED METHODS," filed Oct. 4, 2010; the entire contents of each of the foregoing applications are hereby incorporated by reference herein.

TECHNICAL FIELD

Embodiments disclosed herein relate generally to a reclosable bag with a hook-and-hook closure that may be used to strain liquids, for use in the packaging industry, and more particularly to the convenience food industry, and methods for using the same.

BRIEF DESCRIPTION OF THE DRAWINGS

The written disclosure herein describes illustrative embodiments that are non-limiting and non-exhaustive. Reference is made to certain of such illustrative embodiments that are depicted in the figures as listed below.

FIGS. 16A and 16B illustrate perspective views of another embodiment of a strainable bag that includes a seal at the top end in addition to a hook-and-hook closure.

FIGS. 21A and 21B illustrate perspective views of an embodiment of a strainable bag that includes a seal at the top end in addition to a hook-and-hook closure.

DETAILED DESCRIPTION

Figure 1:
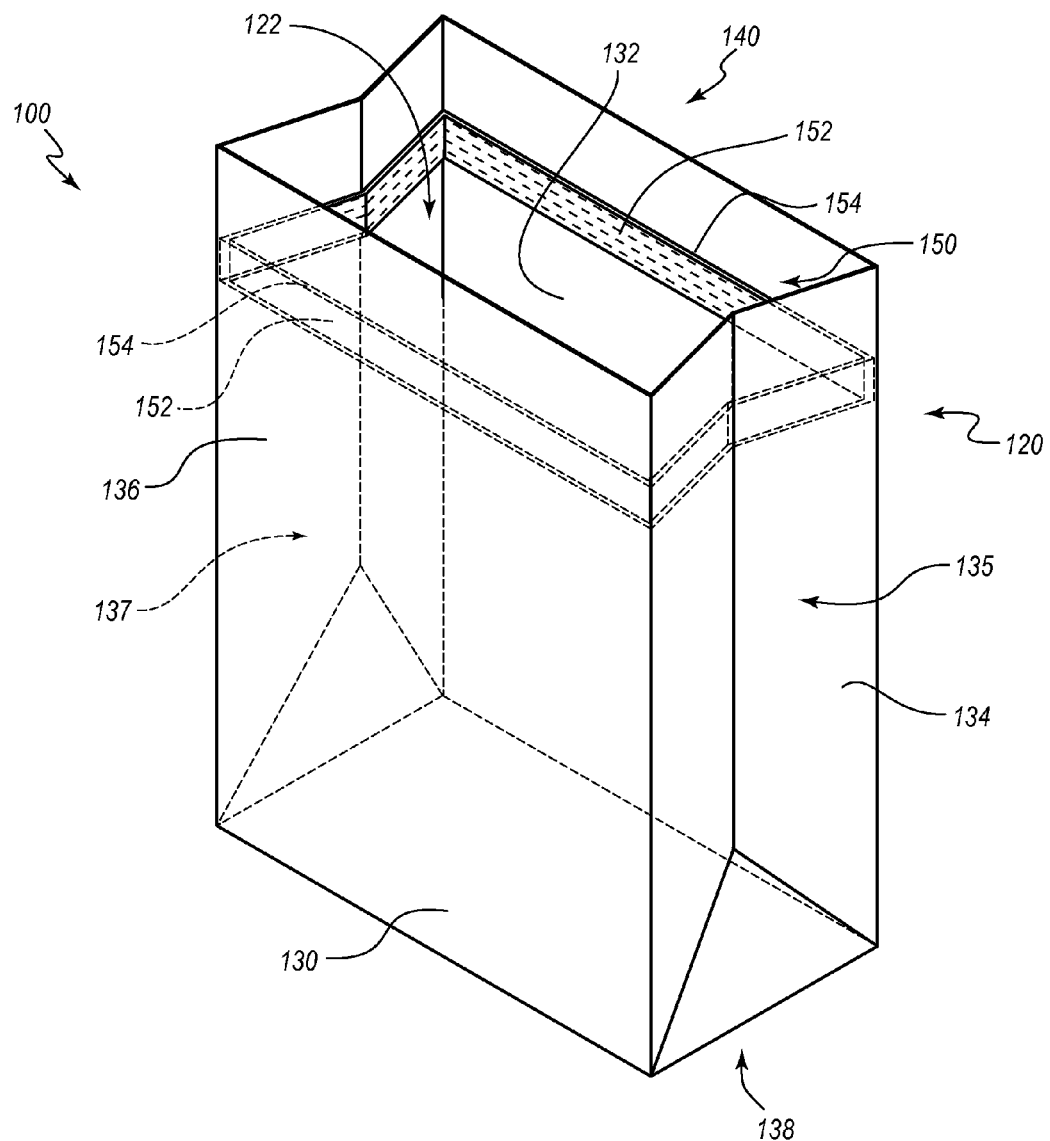
FIG. 1 illustrates a perspective view of an embodiment of a strainable bag having a closed end and an open end with a hook-and-hook closure.

Embodiments of a bag with a strainable and reclosable hook-and-hook closure are disclosed. In certain embodiments, the bag is formed into a full open mouth configuration, also known as a quad seal bag, which can be filled at high speeds. The hook-and-hook closure on the bag allows for liquids within the bag to be separated away from any non-liquid contents by inverting the bag and allowing the liquid to flow out through the closure. The hook-and-hook closure also allows for any gases such as steam to be vented or released through the hook-and-hook closure during food processing.

Because the hook-and-hook closure is reclosable, additional components may be added to the bag after straining a liquid through the closure. In an embodiment, an edible product such as pasta or vegetables may be cooked inside the strainable bag, with steam allowed to escape during cooking (such as in a microwave oven) and any excess liquid then removed from the food by straining through the hook-and-hook closure. The consumer may then open the hook-and-hook closure and add an additional food product, for example, a cheese sauce, breading or additional spices to the bag contents, then reclose the hook-and-hook closure, mix the added sauce, breading or spices with the contents, then open the reclosable closure to access the sauced, breaded or spiced food. The mixing may occur by shaking the bag. Multiple rounds of coating or spicing may occur. The hook-and-hook closure may then be reclosed to seal unused portions of the bag contents into the strainable bag for storage and later consumption.

In an embodiment, liquid may be added to the bag prior to heating the contents. For example, a marinade may be added to a meat product within the bag, and then strained away after a certain amount of time, before cooking the meat. In other embodiments, water or broth may be added to an edible product prior to cooking, and then strained away. In further embodiments, the contents of the strainable bag may not be heated at all after the addition or removal of liquid, or they may cooled.

The strainable bag may be formed from single or multiple layers of paper or a polymeric material, or combinations thereof. Each layer can provide the strainable bag with one or more desirable characteristics, depending on the application of the bag, such as moisture retention or extra strength. The strainable bag may also incorporate an element such as an integrated handle, expandable side gussets, or a bowl-shaped bottom, for consumer convenience. In certain embodiments, the strainable bag may have a second closure which may be liquid- and/or air-tight and may also be reclosable. Such embodiments, as well as others, are herein disclosed in detail.

In certain embodiments, a strainable bag may be used in additional industrial applications other than for food. For example, in an embodiment, liquid dye may be strained from products such as yarn or fabric. Alternatively, ink or paint may be strained from small parts, such as golf tees or toys. In an embodiment, industrial parts may be strained from oil or cleaning solutions. Thus, it is envisioned that the strainable bag disclosed herein may be useful in a wide array of industrial or commercial applications where decanting a liquid from a solid is advantageous.

Embodiments of methods of using a strainable bag are also disclosed herein. The following discussion includes specific references to certain of such embodiments. The discussion is for illustrative purposes only, and should not be construed as limiting. Moreover, any suitable combination of the following disclosure with any portion of the foregoing disclosure is contemplated.

FIG. 1 illustrates a perspective view of an embodiment of a strainable bag 100. The bag 100 can include a body portion 120, which can be substantially tubular in form (and thus be also be referred to herein as a tube body 120), and which defines a cavity 122. For example, in some embodiments, the body portion 120 includes a front wall 130, a back wall 132, a first side wall 134, and a second side wall 136. In certain embodiments, the strainable bag 100 defines a full open mouth configuration, and can include a closed bottom end 138 of the body portion 120. When the strainable bag 100 is in a full open mouth configuration, a top end 140 of the bag 100 can be open such that a food product can be received into the cavity 122 of the bag 100, and the product can be maintained within the bag 100 via the closed bottom end 138.

The top end 140 of the bag can comprise a hook-and-hook closure 150, with a hook-and-hook track 152. The hook-and-hook closure 150 is reclosable such that the closure can be selectively transitioned between a closed and an open configuration. Transitioning between the closed and open configurations may occur multiple times, as desired, without the need for perfectly overlapping alignment of the hook-and-hook track 152. In some embodiments, the hook-and-hook closure 150 comprises one or more connection portions 154 by which the hook-and-hook track 152 is joined to the body portion 120 of the bag. The one or more connection portions 154 can include one or more of a skirt, flaps, or extensions that extend away (e.g., upwardly and/or downwardly) from the resealable portions of the hook-and-hook track 152, which resealable portions are further discussed below. The connection portion 154 can couple the hook-and-hook track 152 with the body portion 120, in any suitable manner, at the top end 140 of the body portion 120. In some embodiments, the connection portion 154 can form a substantially liquid-tight seal between the hook-and-hook track 152 and the body portion 120. In other embodiments, the connection portion 154 may be connected to the tube body 120 more generally at any suitable position between the top end 140 and the closed bottom end 138.

In certain embodiments, the connection portion 154 of the hook-and-hook closure 150 comprises a heat-sealable material. In some embodiments, the connection portion 154 is placed in contact with a portion of an inner surface of the tube body 120, which can also be heat sealable. The heat-sealable portions of the connection portion 154 and the tube body 120 can be heat sealed to each other. Any suitable heat sealing methods and materials may be used, such as those discussed herein.

In some embodiments, the body portion 120 comprises a sheet of material that is folded or otherwise formed into the substantially tubular structure. The material can comprise multiple layers, each of which can provide or aid in providing desirable functional characteristics to the strainable bag 100. In certain embodiments, the first and second sidewalls 134, 136 may be gusseted, to allow for expansion and/or reinforcement of the cavity 122 of the strainable bag 100. For example, the sidewalls 134, 136 may each contain a single gusset 135, 137, as shown. In other embodiments, the sidewalls may contain multiple gussets. In some embodiments, the sidewalls 134, 136 of the tube body 120 can be urged inward to form the gussets, and can be creased, pleated or folded.

Figure 2:
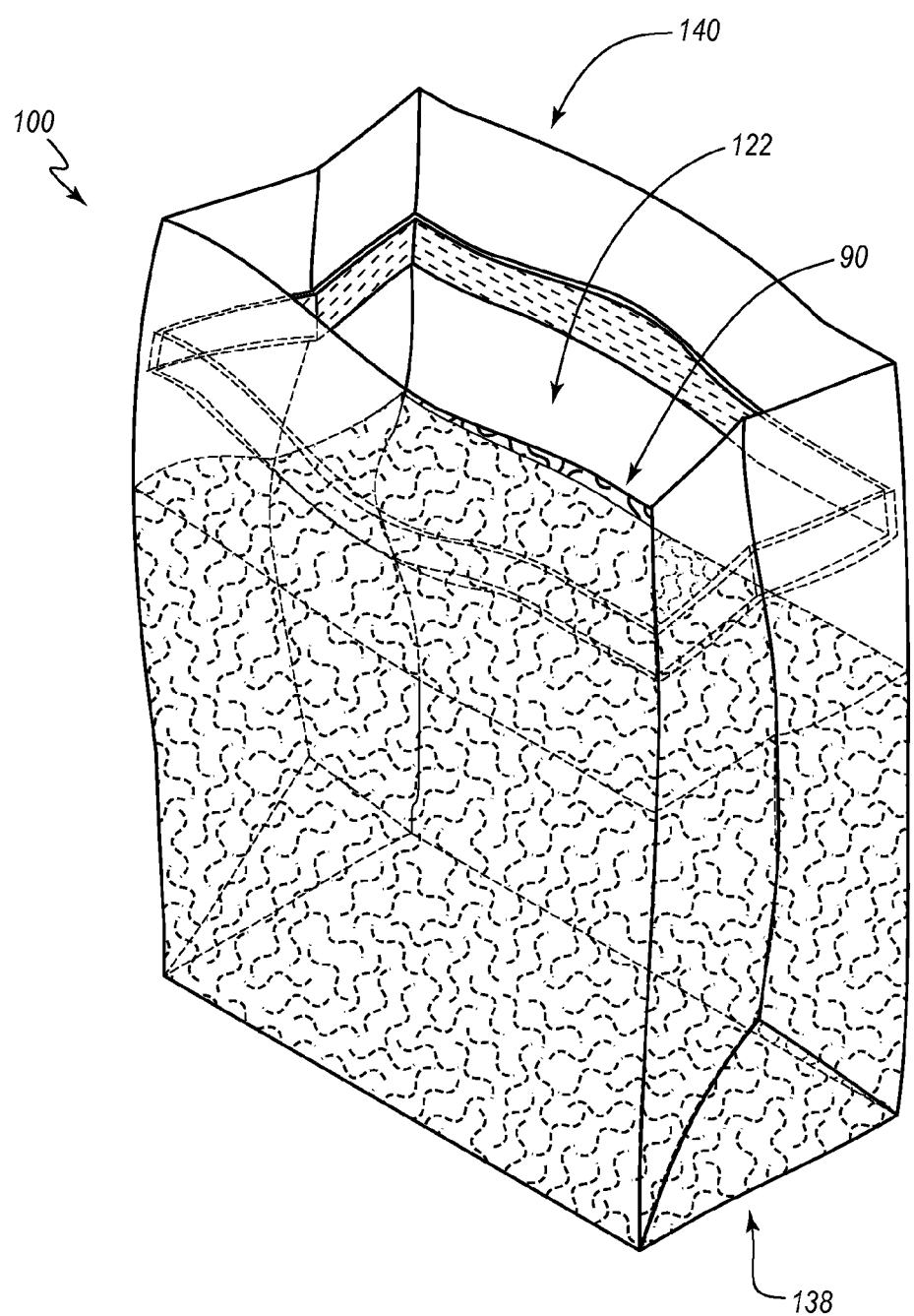
FIG. 2 illustrates a perspective view of the strainable bag of FIG. 1 having a food product positioned therein.

In some embodiments, the hook-and-hook closure 150 extends around the perimeter of the tube body 120, including the gusseted side walls (e.g., the side walls 134, 136). The hook-and-hook closure 150 can extend along the first, second, third, and fourth walls 130, 132, 134, 136 in a substantially fixed state. When closed by the user, as described in more detail below, the hook-and-hook closure 150 can hold the front, side and back walls in close engagement with one another so as to form a substantially closed seal, as defined below. In other embodiments, the hook-and-hook closure 150 may extend about only a subset of the walls 130, 132, 134, 136. Stated otherwise, the hook-and-hook track 152 can extend about at least a portion of the perimeter of the tube body 120. For example, in some embodiments With reference to FIG. 2, in certain embodiments, the strainable bag 100 can have contents, such as a food product 90, introduced into the cavity 122. Once the food product 90 is within the strainable bag 100, the bag 100 can be closed in any suitable fashion. For example, in the illustrated embodiment, the bottom end 138 of the strainable bag 100 is closed prior to introduction of the food product 90 into the bag, and the top end 140 can be closed thereafter, such as in the manner discussed with respect to FIG. 3.

Figure 3:
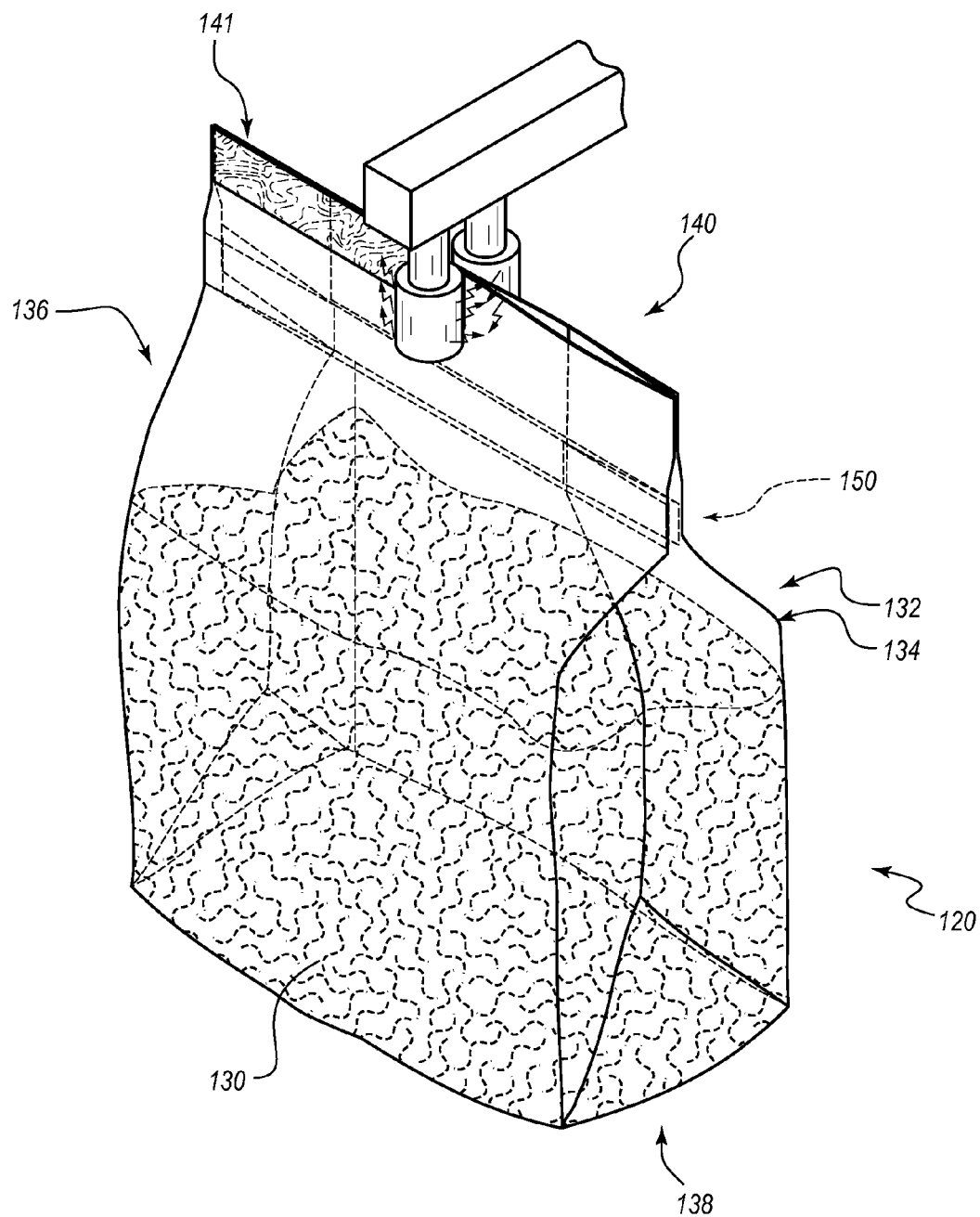
FIG. 3 illustrates a perspective view of the strainable bag of FIG. 1, wherein the top end of the bag is being sealed.

With reference to FIG. 3, in certain embodiments, a heat-seal and/or an adhesion seam can form a seal 141 that closes the top end 140 of the strainable bag 100. The seal 141 can be spaced from the hook-and-hook closure 150 such that the seal 141 can function independently of the hook-and-hook closure 150. Moreover, the seal 141 can be distanced from the hook-and-hook closure such that heating and/or sealing the seal 141 does not affect the hook-and-hook closure 150. In certain embodiments, the seal is an air- and/or liquid-tight seal. Stated otherwise, in the illustrated embodiment, the strainable bag 100 has a self-opening sack bottom at the bottom end 138, and the top end 140 can be closed in any suitable manner (e.g., via a heat seal and/or an adhesion seal). In some embodiments, the seal 141 at the top end can be reclosable (e.g., capable of being transitioned between an open orientation and a closed orientation), whereas in other embodiments, the seal 141 can instead be removable from the bag 100. Accordingly, for certain portions of the following discussion, it can be assumed that the bottom end 138 of the bag has been previously sealed, and the top end 140 of the bag is subsequently sealed. In certain embodiments, the bottom end 138 of the bag is air- and/or liquid-tight.

Any suitable reclosable or non-reclosable closure may be used to seal the top end 140, if desired, in addition to the hook-and-hook closure 150. For example, the top end 140 may be sealed in a reclosable manner with a press-to-close seal or a zipper block and track system, in addition to the hook-and-hook closure 150. The additional closure may be air- and/or liquid-tight.

In certain embodiments, the top end 140 may be heat sealed in a non-reclosable manner for transport, leaving the hook-and-hook closure 150 available for straining and reclosing. Sealing the top end 140 may be useful to provide a moisture or oxygen resistant barrier to reduce degradation of the product 90. In an embodiment, the sealing of the top end 140 may include a score line or weakened portion 143 (see FIG. 5) of the seal 141 to aid in opening the top end of the strainable bag 100.

In a further embodiment, a strainable bag 100 has a top end 140 that is initially sealed with a heat seal with a score line, and may also include a reclosable seal, such as, for example, a zipper track, in addition to the hook-and-hook closure 150. This configuration would be desirable, for example, for a strainable bag containing frozen vegetables. The consumer may tear off the heat seal portion of the top bag end 140 along the score line, optionally add water to the contents of the bag, close the hook-and-hook closure 150, heat the bag and its contents in a microwave oven, and strain away any liquid from the interior of the bag through the closed hook-and-hook closure 150, as discussed further below. During the heating process, the hook-and-hook closure 150 acts as a vent to release steam and any other gases generated during the heating process.

Figure 4:
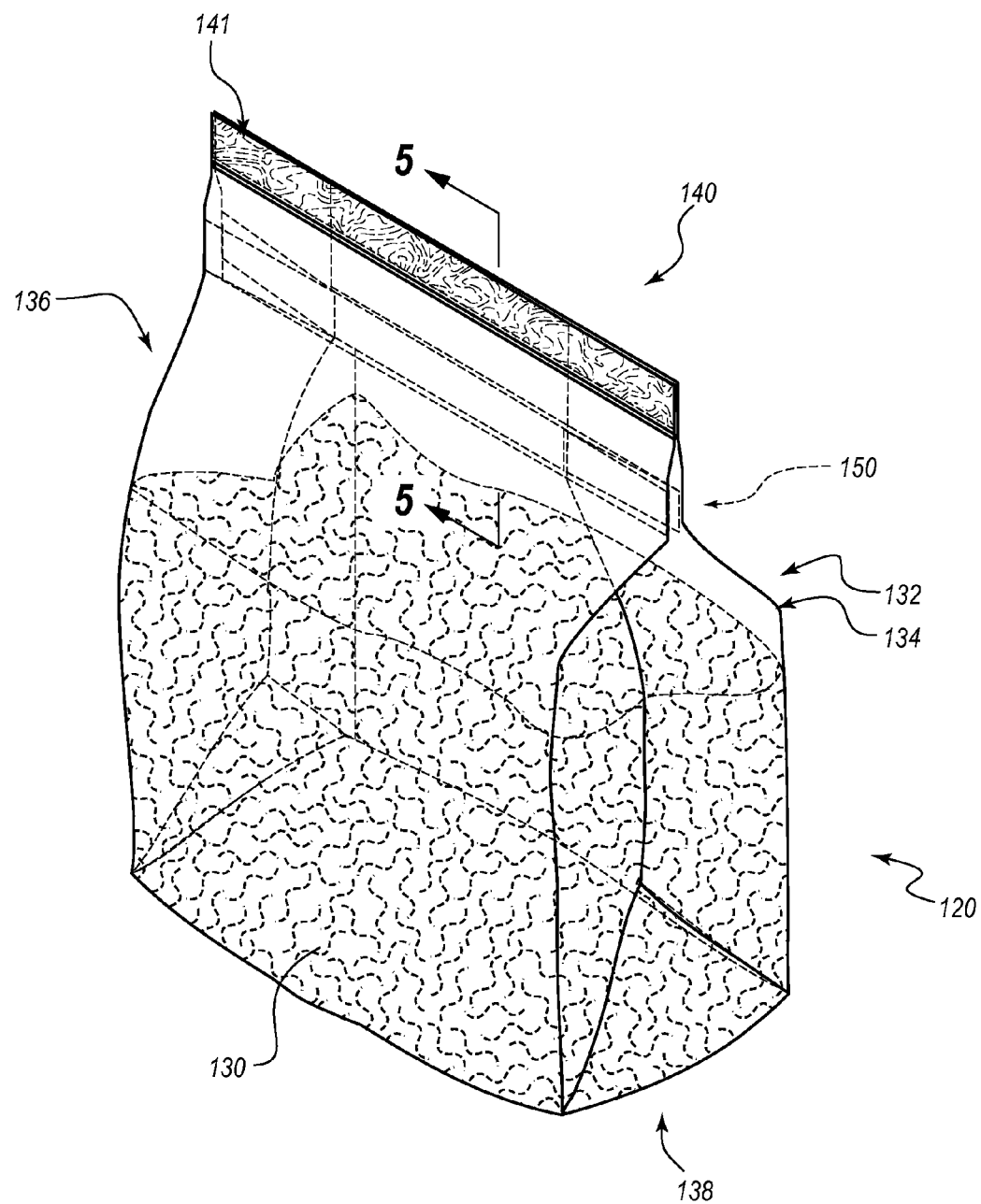
FIG. 4 illustrates a perspective view of the strainable bag of FIG. 1, wherein an entirety of the top end has been sealed.
Figure 5:
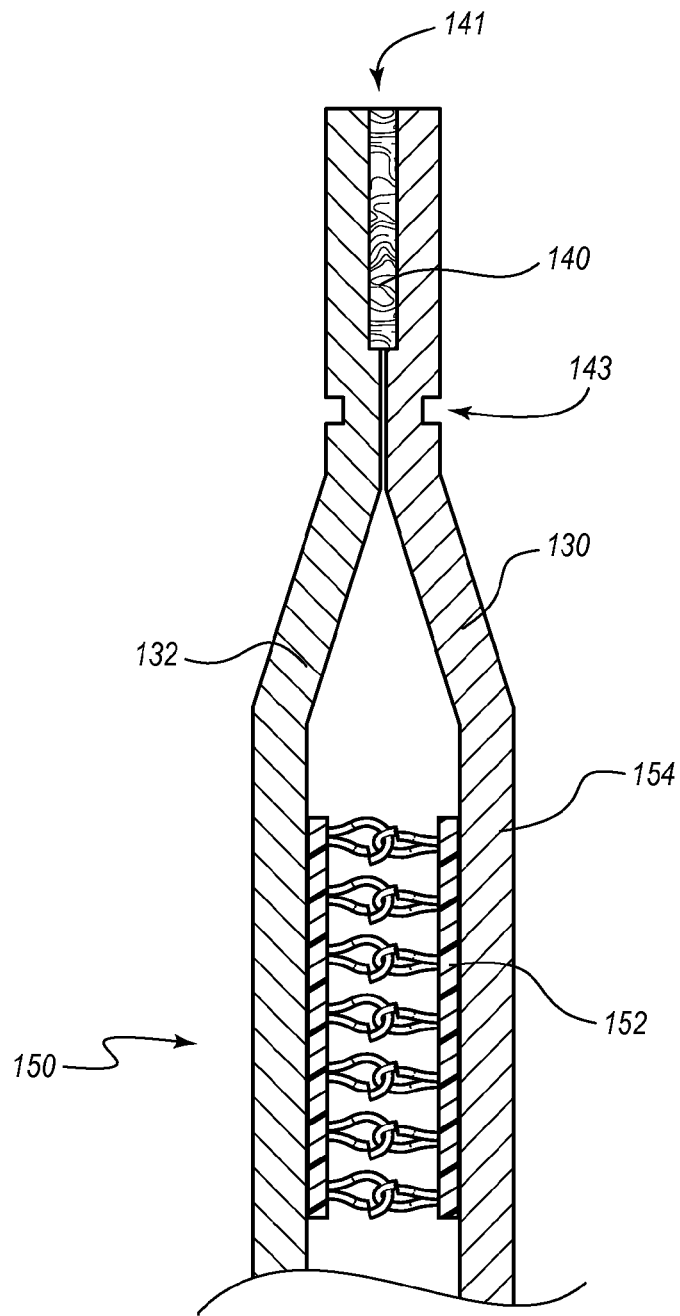
FIG. 5 illustrates a partial cross-sectional view of the strainable bag of FIG. 1 taken along the view line 5-5 of FIG. 4.

With reference to FIGS. 4-5, looking along the axis defined along sight line 5 in FIG. 4, the top end 140 may be sealed without affecting the connection portion 154 and track 152 of the hook-and-hook closure 150. In an embodiment, there is a space along the axis between the top end 140 and the hook-and-hook closure track 152 to allow for a user to grasp the front and back walls 130, 132 and open or close the bag if the top end 140 and seal has been removed. In other embodiments, there may be space between the hook-and-hook closure 150 and the bag bottom end 138 for this purpose.

In an embodiment, the top end 140 is heat sealed and laser scored so as to form the seal 141 and the weakened portion 143, respectively (FIGS. 4 and 5). After opening the strainable bag 100 to access the cavity within, along the laser score and removing the torn upper portion of the top end from the bag, the top end 140 is shorter than before it was heat sealed, but the space within the cavity along the axis between the remnants of top end 140 and the hook-and-hook closure track 152 is sufficient to allow a user to grasp the front and back walls 130, 132 and open and reclose the strainable bag using the hook-and-hook closure 150. In certain embodiments, portions of the bag surrounding the cavity portion along the axis between the remnants of top end 140 and the hook-and-hook closure track 152 may be reinforced to aid the user in opening and reclosing the strainable bag 100.

Figure 6:
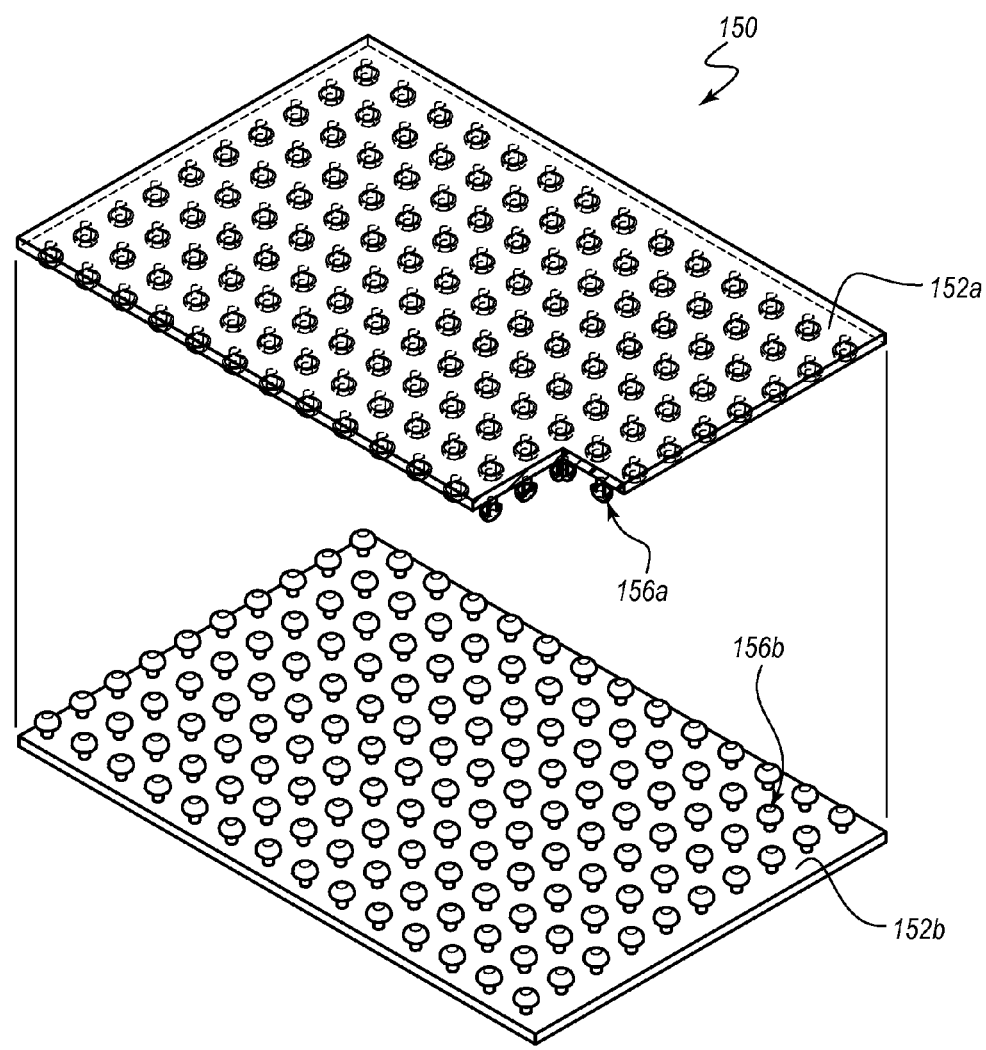
FIG. 6 illustrates a partial exploded view of an embodiment of a hook-and-hook closure, which is compatible with the bag of FIG. 1.

With reference to FIGS. 6-7, the hook-and-hook closure 150 can be formed of T-shaped or mushroom-shaped hooks or appendages 156a, 156b. The hook-and-hook closure 150 is reclosable such that the closure can be selectively opened or closed repeatedly, as desired, without the need for perfect alignment of the hook-and-hook track 152 on the connection portions 154.

Figure 7A:
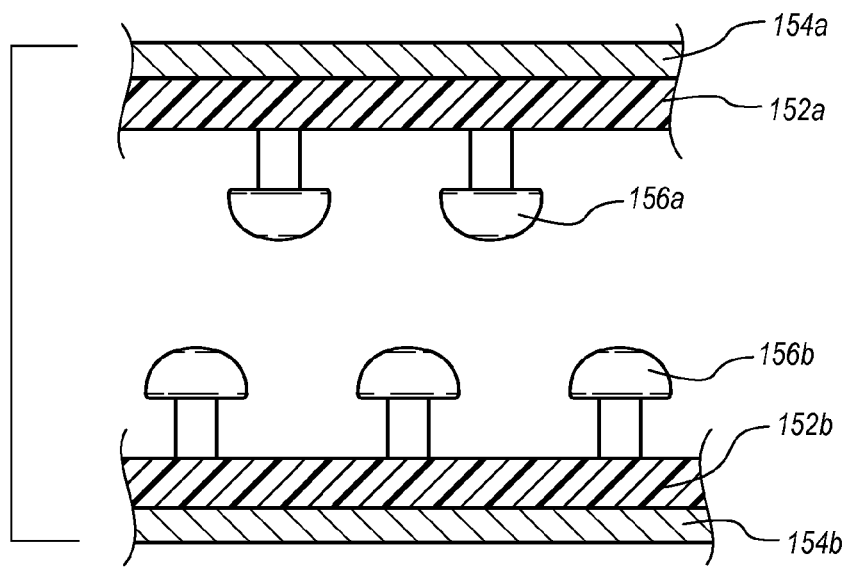
FIGS. 7A and 7B illustrate partial cross-sectional views of the hook-and-hook closure of FIG. 6 that is being transitioned from an open state to a closed state such that hooks are engaged with each other.
Figure 7B:
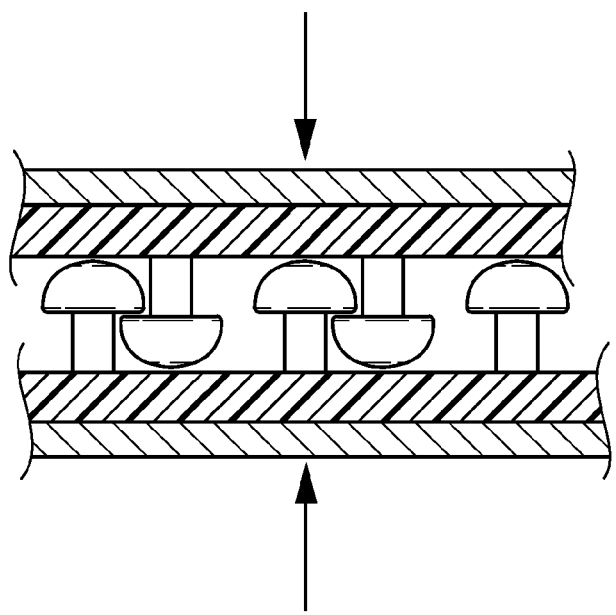
Figure 8:
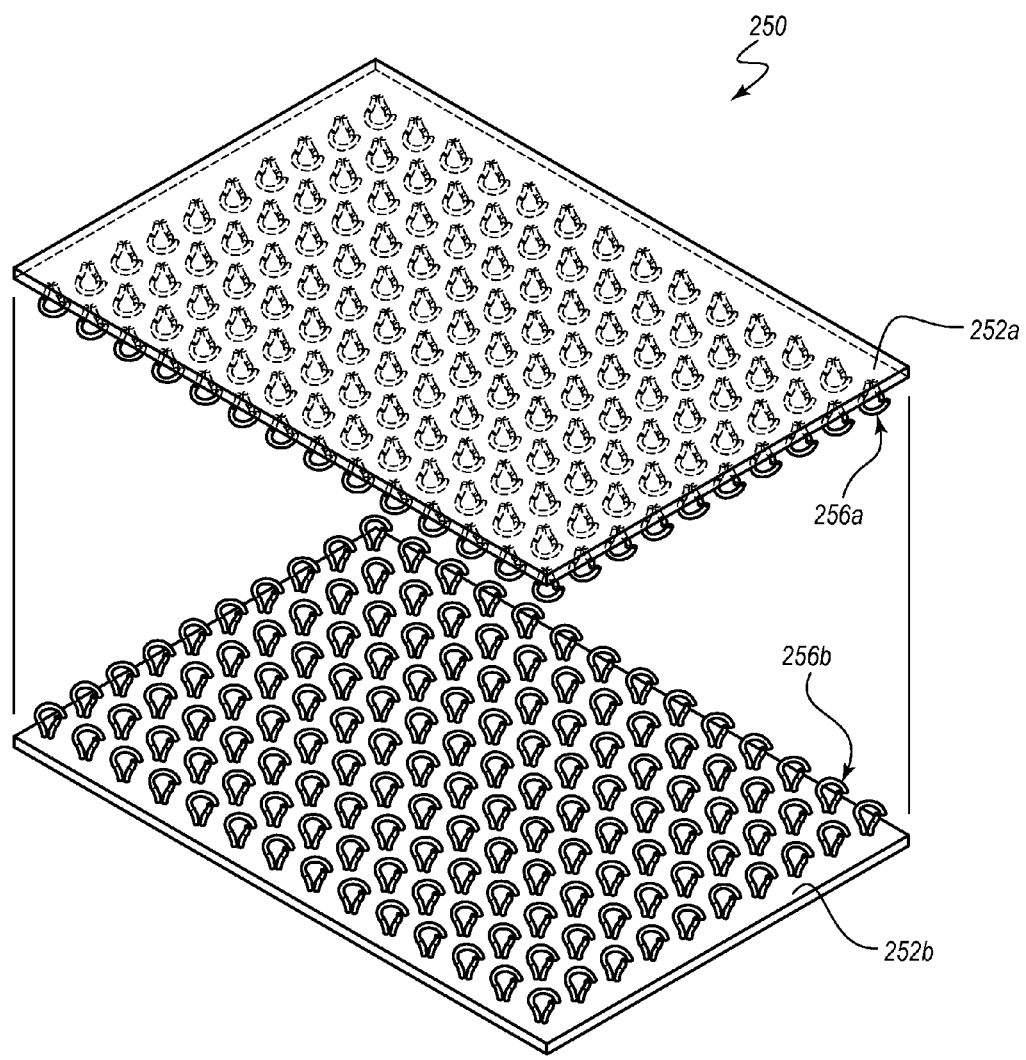
FIG. 8 illustrates a partial exploded view of another embodiment of a hook-and-hook closure, which is compatible with the bag of FIG. 1.

The hook-and-hook closure 150 comprises a hook-and-hook track 152a which may be connected to the strainable bag 100 via a connection portion 154a, and that is opposite from another hook-and-hook track 152b which may be connected to the bag 100 via a connection portion 154b. Tracks 152a, 152b are configured to engage each other and disengage from each other. In some embodiments, hook-and-hook tracks 152a, 152b can form a substantially closed seal when engaged with each other. A user can compress any portion of the hook-and-hook tracks 152a, 152b into sealed contact with each other to transition the hook-and-hook closure 150 to the engaged, or closed, state (FIGS. 7A-7B). By aligning a portion of track 152a containing hook 156a, with a portion of track 152b containing hook 156b, and pressing the tracks 152a, 152b together with sufficient force (FIG. 7B), a user can close the closure. As used herein, the term "substantially closed seal" refers to a seal that is firmly closed so as to resist opening, yet is not air-tight or liquid-tight. Stated otherwise, a substantially closed seal can be in a closed configuration, yet can, for example, permit one or more gases and/or liquid to flow therethrough (e.g., through the spaces shown in FIG. 7B).

Because of the multiple hooks 156a, 156b in each respective track 152a, 152b, perfect alignment of the tracks 152a, 152b is not necessary to obtain a substantially closed seal. The user can manually pull the hook-and-hook tracks 152a, 152b apart to cause the hooks of the hook-and-hook closure 150 to separate from each other to transition the hook-and-hook closure 150 from the engaged, or closed, state (FIG. 7B) to the disengaged, or open, state (FIG. 7A). As the hooks 156a, 156b are not damaged by engaging or disengaging, multiple engagements and disengagements are possible.

The ability of the hook-and-hook tracks 152a, 152b to seal the side walls 134, 136 of strainable bag 100 without requiring perfect alignment of the tracks is particularly useful, and is unlike certain conventional closures comprising, for example, a press-to-seal or zipper track and block system.

With reference to FIGS. 1 and 8-10, in other embodiments, the top end 140 of the strainable bag can comprise a hook-and-hook closure 250. The hook-and-hook closure 250 can be formed of hook-shaped appendages 256a, 256b. In some embodiments, the hook-and-hook closure 250 comprises one or more connection portions 254, which can comprise a skirt, flaps, or extensions. The connection portion 254 can be connected to the top end 140 of the tube body 120 in any suitable manner, and in some embodiments, can form a seal therewith. In other embodiments, the connection portion 254 may be connected to the tube body 120 in a position between the top end 140 and the closed bottom end 138.

Figure 9C:
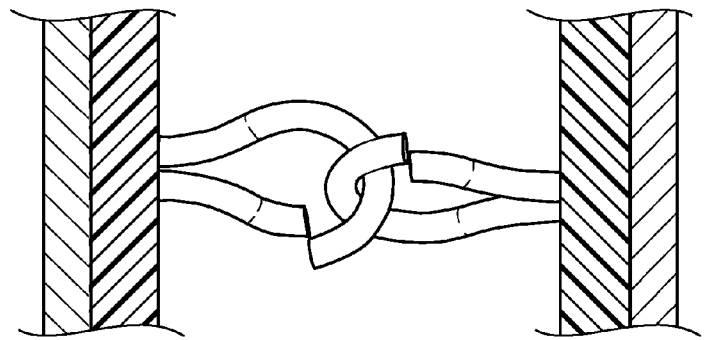
FIGS. 9A-9C illustrate partial cross-sectional views of the hook-and-hook of FIG. 8 being transitioned from an open state to a closed state such that hooks are engaged with each other.
Figure 9B:
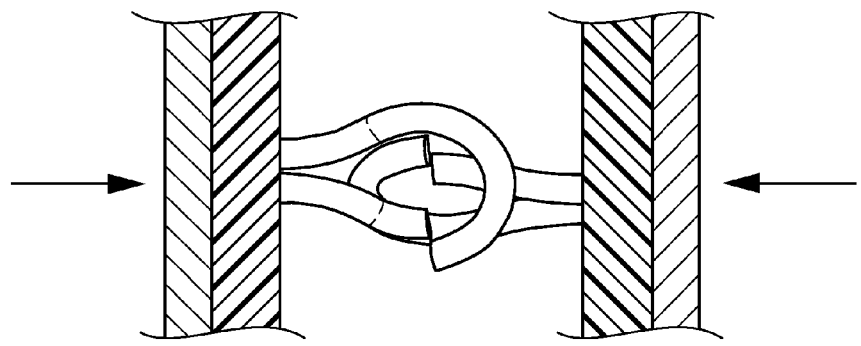
Figure 9A:
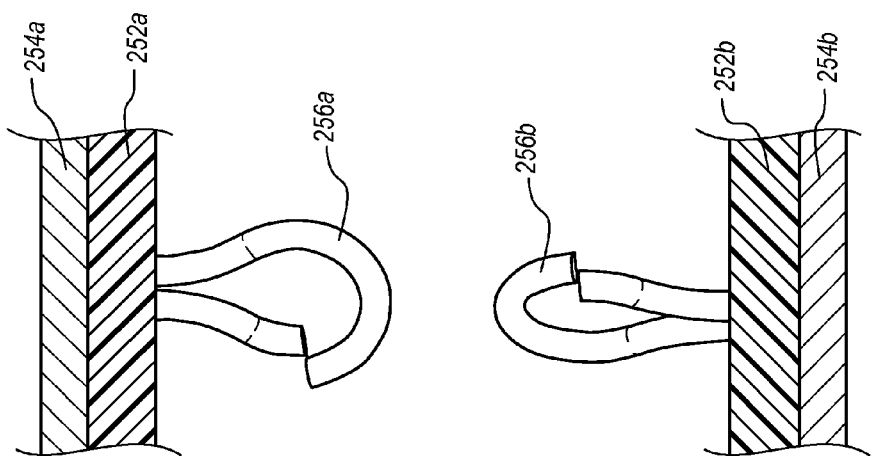

The hook-and-hook closure 250 comprises a hook-and-hook track 252a that is opposite from another hook-and-hook track 252b. Tracks 252a, 252b are configured to engage each other and disengage from each other. In some embodiments, hook-and-hook tracks 252a, 252b can form a substantially closed seal when engaged with each other. A user can compress any portion of the hook-and-hook tracks 252a, 252b into sealed contact with each other to transition the hook-and-hook closure 250 to the engaged, or closed, state (FIGS. 9A-9C). By aligning a portion of track 252a containing hook 256a, with a portion of track 252b containing hook 256b, and pressing the tracks 252a, 252b together with sufficient force (FIG. 9B), a user can close the closure (FIG. 9C). Because of the multiple hooks 256a, 256b in each respective track 252a, 252b, perfect alignment of the tracks 252a, 252b is not necessary to obtain a substantially closed seal.

Figure 10C:
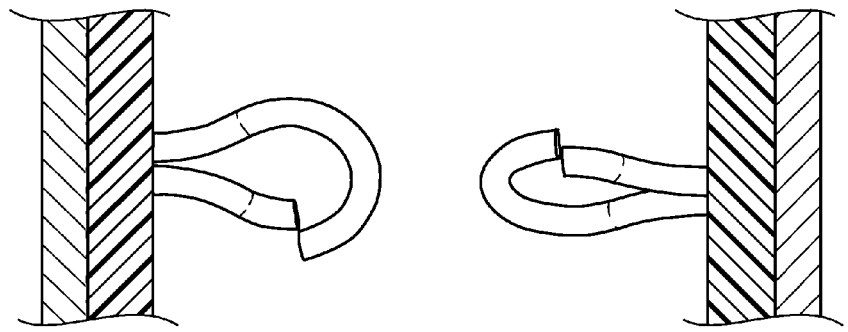
FIGS. 10A-10C illustrate partial cross-sectional views of the hook-and-hook closure of FIG. 8 being transitioned from the closed state to the open state such that the hooks are disengaged from each other.
Figure 10B:
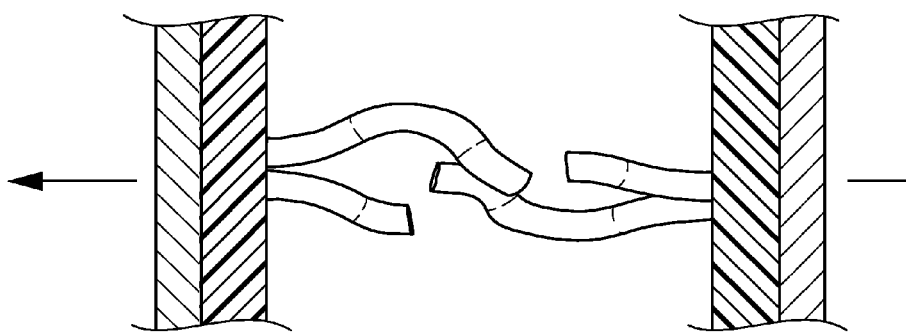
Figure 10A:
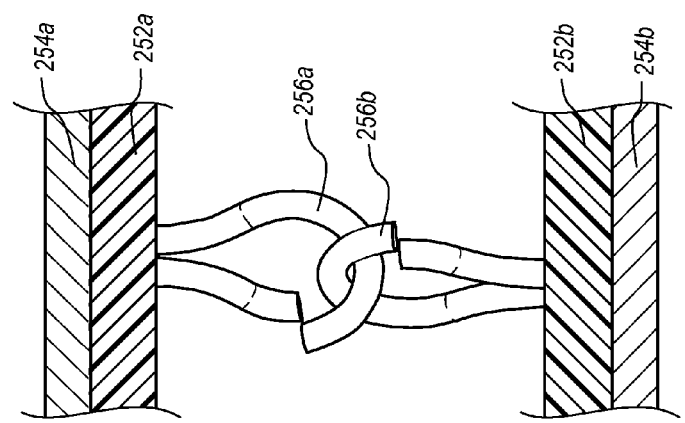

With reference to FIGS. 10A-10C, the user can manually pull the hook-and-hook tracks 252a, 252b apart to cause the hook-and-hook closure 250 to separate from each other to transition the hook-and-hook closure 250 from the engaged, or closed, state (FIG. 10A) to the disengaged, or open, state (FIG. 10B). Pulling apart tracks 252a, 252b with sufficient force to cause hooks 256a, 256b to no longer interact (FIG. 10B), will open or disengage the hook-and-hook closure 250. As the hooks 256a, 256b are not damaged by engaging or disengaging, multiple engagements and disengagements are possible.

With reference to FIGS. 11-14, exemplary methods of preparing or processing various food products are shown. As used herein, the term "processing" encompasses various techniques used to prepare foods, including, for example, marinating, rehydrating, heating, cooling, freezing, stirring, mixing and adding spices or other ingredients.

Figure 11:
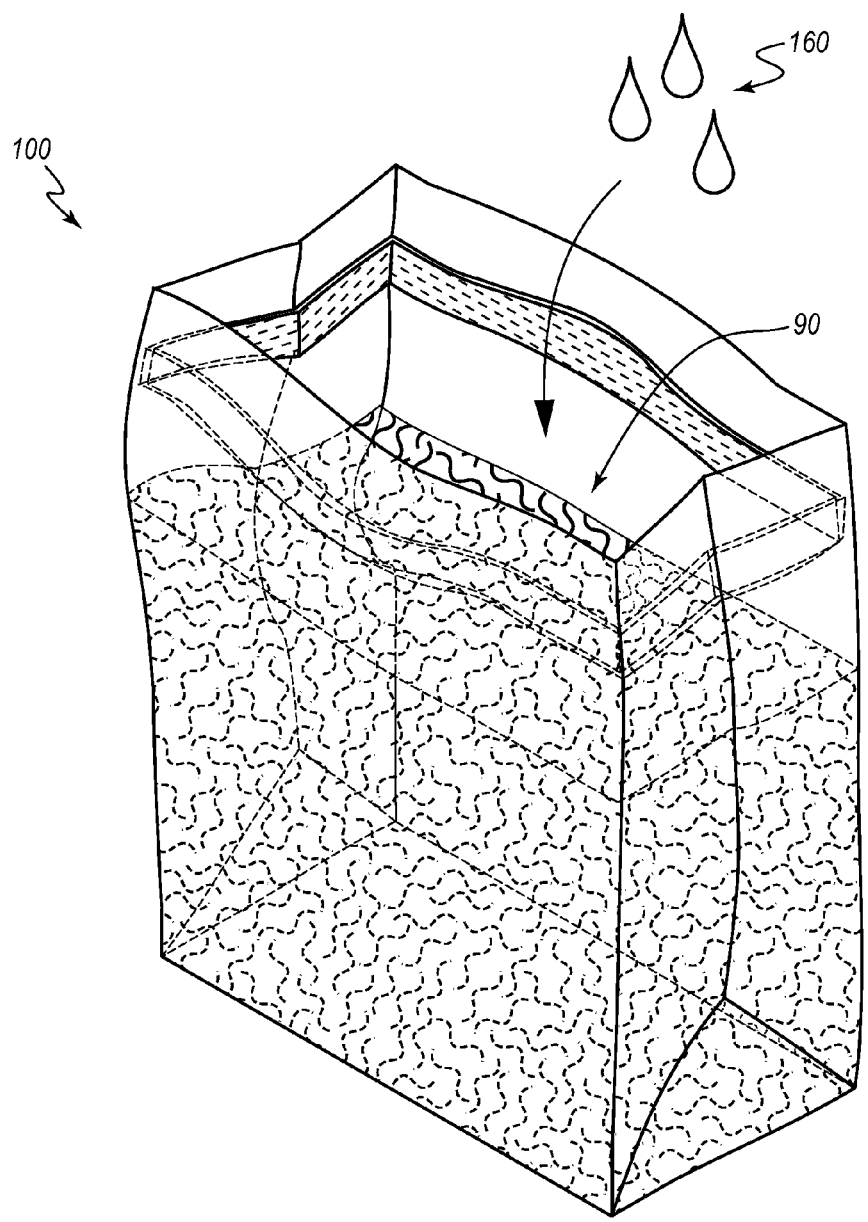
FIG. 11 illustrates a perspective view of the strainable bag of FIG. 1 having a food product therein that is undergoing processing, wherein a seal has been removed from the upper end of the bag and the hook-and-hook closure is in an open configuration to permit entrance of a liquid into the bag.
Figure 12:
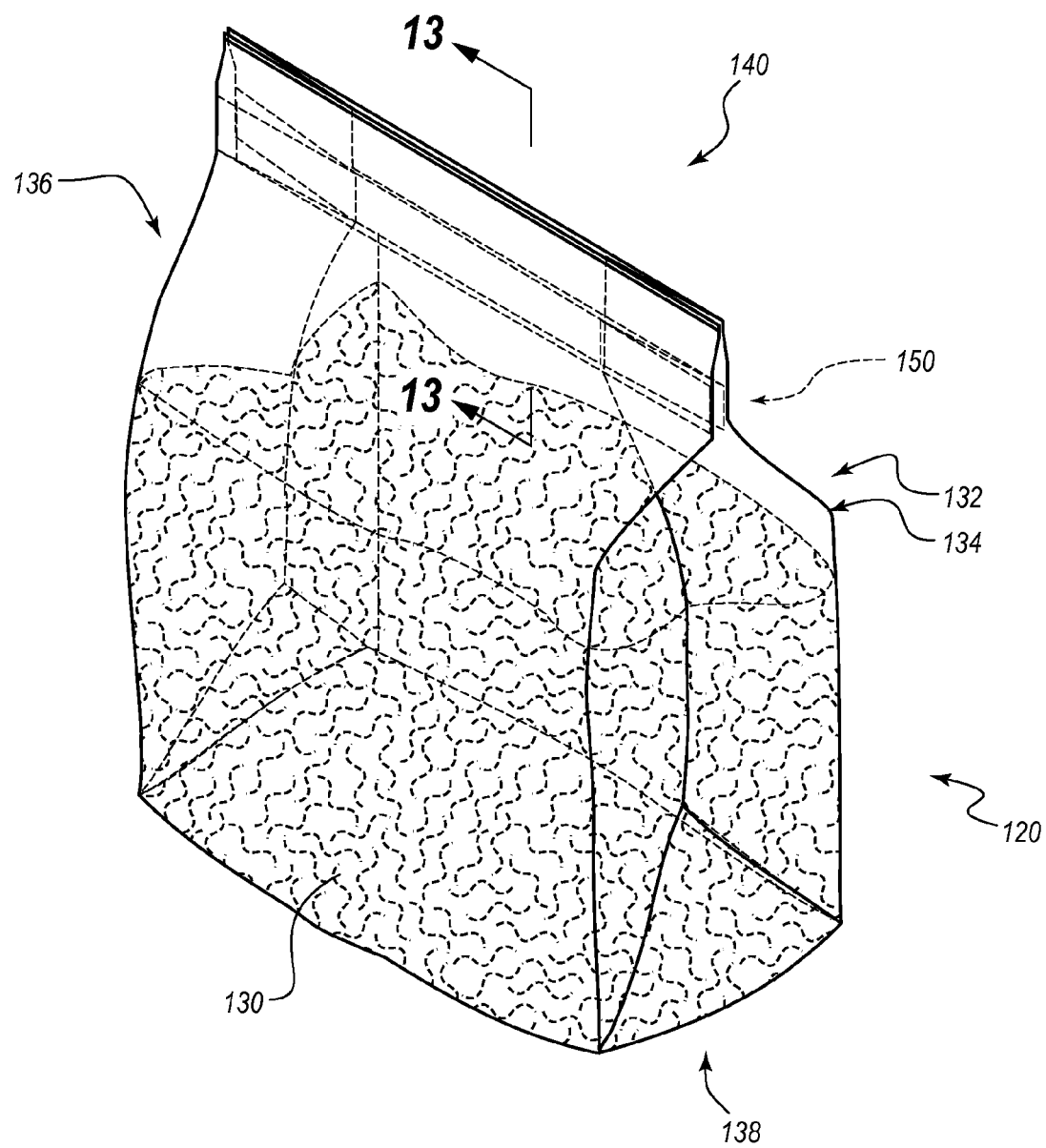
FIG. 12 illustrates a perspective view of the bag of FIG. 1 subsequent to the processing shown in FIG. 11, wherein the hook-and-hook closure is closed.
Figure 13:
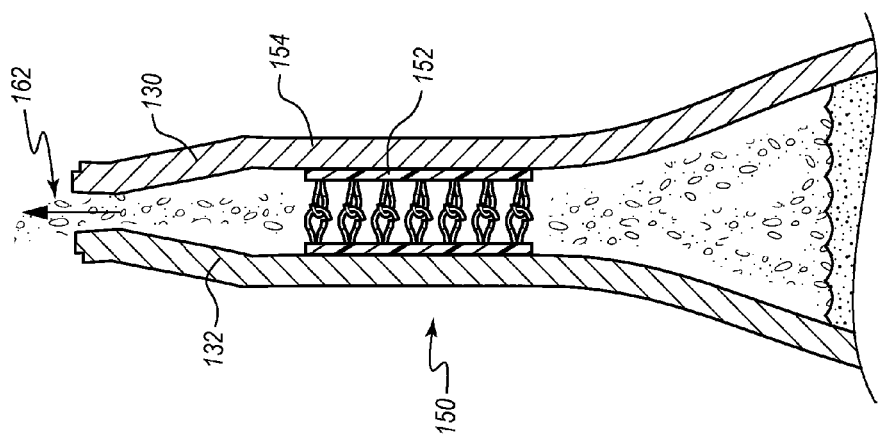
FIG. 13 illustrates a partial cross-sectional view of the bag of FIG. 1 taken along the view line 13-13 of FIG. 12, which depicts that the hook-and-hook closure allows steam to escape from the interior of the bag to the exterior of the bag.

To the cavity 122 of the strainable bag 100, which contains a food product 90, may be added a liquid 160, such as water, a marinade, or broth (FIG. 11). The hook-and-hook closure 150 of the strainable bag 100 is closed (FIG. 12), and the food may be processed with heat to cook the food. Steam or other gases 162 may be vented or released through the hook-and-hook closure 150, via the voids between the hooks (FIG. 13). At least a majority of the liquid 160 may then be strained out of the bag 100 while retaining at least a majority of any non-liquid content within the bag by inverting the strainable bag 100 and allowing the liquid to pour out or drain between the hooks. In an embodiment, the bag is oriented so as to allow at least a majority of any liquid inside the bag to drain from the food product through the closed hook-and-hook closure. The bag may then be opened to access or expose the food product, for further processing or consumption.

In certain embodiments, the hook-and-hook closure allows for liquid to be strained out of the bag through the hook-and-hook closure while retaining at least a majority of any non-liquid content within the bag. For example, in an embodiment, at least about 95% of the non-liquid content may be retained within the bag. In a further embodiment, at least about 75% of the non-liquid content may be retained within the bag.

Figure 14:
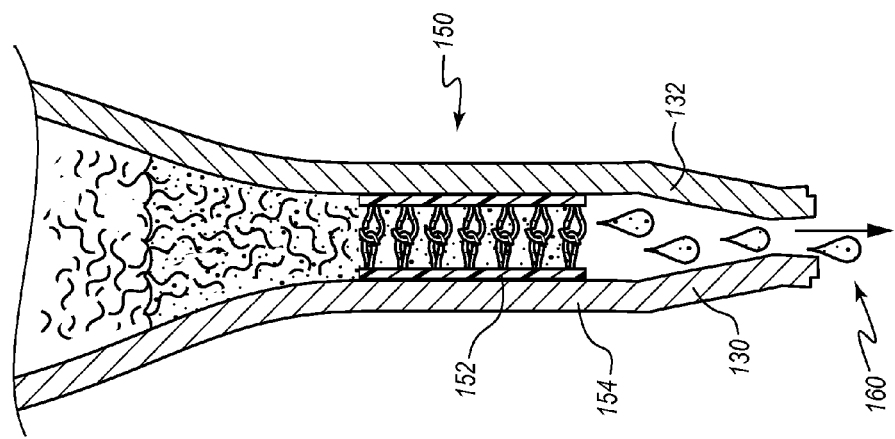
FIG. 14 illustrates a partial cross-sectional view of the bag of FIG. 1 taken along the view line 13-13 of FIG. 12, which depicts the bag having been inverted and liquid being strained through the closed hook-and-hook closure.

In certain embodiments where no additional liquid is added to the bag, the processing of the food may nonetheless result in liquid being present, which may be removed by straining through the hook-and-hook closure. In an embodiment, some particles may be removed from the bag contents together with the strained liquid (FIG. 14). In an embodiment, a liquid such as a marinade may be strained away prior to heating or otherwise further processing the food product.

Depending on the contents and desired use of the strainable bag, the length and thickness of the hooks 156, as well as the density of the hooks on the hook track 152 and the width of the hook track 152, may vary. For example, where a heavier food product 90 is used within the bag, a stronger hook-and-hook closure 150 may be desired, as compared with situations in which a lighter food product is used. The strength of the closure 150 may be affected by varying certain of the above-listed parameters. Further, the intended use of the strainable bag can aid in determining the desired strength of the closure 150.

Figure 15:
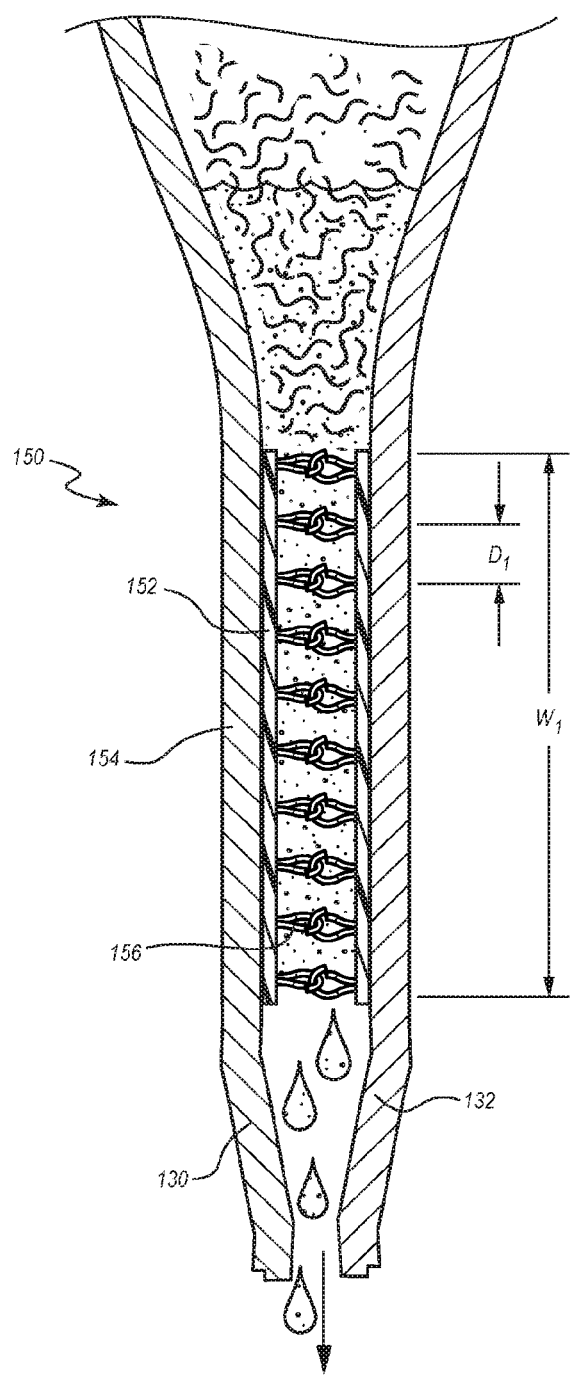
FIG. 15 illustrates an enlarged cross-sectional view such as that of FIG. 14 of another embodiment of a stronger hook-and-hook closure through which liquid is being drained.

With reference to FIG. 15, the width $W_1$ of the hook-and-hook track 152 may be larger if the contents of the bag are heavy, compared to its width if the contents are lighter. For example, an embodiment of a strainable bag which contains a large piece of meat to be marinated may have a wider hook-and-hook track 152 with a larger value $W_1$ than an embodiment of a strainable bag which contains a small portion of vegetables to be steam cooked, due to the weight of the contents on the hook-and-hook closure 150 when the strainable bag is inverted to strain away any liquids from the inside of the bag.

In some embodiments, such as where the intended use of the bag includes, for example, adding a cheese sauce or additional spices to the contents and subsequent mixing of the contents, the hook-and-hook closure 150 may desirably be strong enough to withstand rigorous manual shaking of the closed bag. In addition, a wider track 152 may be needed for larger bags and a narrower track for smaller bags.

In certain embodiments, the width $W_1$ of the track 152 ranges from between about 5 mm to about 50 mm, between about 10 mm to about 25 mm, is at least about 2 mm wide, or is no more than about 50 mm wide.

The strength of the hook-and-hook closure 150 may also be varied by changes in the density of the hooks 156 on the tracks 152. The density of hooks may be varied by changing the distance between adjacent hooks ($D_1$) and thus changing the number of hooks 156 in a given area of a track 152. The density of hooks also may vary depending upon the weight and nature of the product 90. For example, a larger bag containing a heavy product may require a smaller distance between adjacent hooks $D_1$ than a smaller bag containing a lightweight product, as the closure 150 needs a higher hook density to make a stronger seal, such that inadvertent opening of the closure is difficult under the heavier load.

In other embodiments, the strength of the materials used for the hooks 156, the tracks 152 and the connection portions 154 used in the closure 150 may increase, to also increase the strength of the closure. This may be accomplished, for example, by using a more rigid polymer for the hooks 156 of the closure 150. Similarly, using a polymer with a higher amount of friction for the hooks 156 may increase the strength of the closure, as may use of a stronger bond between the walls 130, 132 and the connection portions 154 of the closure 150.

Additional parameters which may affect the strength of the hook-and-hook closure 150 include the gauge or thickness of the hooks 156. A thicker or broader hook would create a stronger linkage with its opposite hook when the closure is engaged, strengthening the closure. In certain embodiments, the hook 156 may have a thickness ranging between about 0.25 mm to about 5.0 mm, between about 0.5 mm and about 3.0 mm, between about 0.75 mm and about 1.5 mm, no more than about 5.0 mm, or no less than about 0.25 mm.

With further reference to FIG. 15, the distance between adjacent hooks $D_1$ also affects the straining efficiency of the liquids being separated from the contents of the strainable bag. The optimum hook density for a strainable bag 100 may vary depending on the intended use of the bag. There may need to be a balance found between the ability of the hook-and-hook closure 150 to retain particles of a certain size, such as spices or dehydrated food pieces, yet allow steam and liquid to flow efficiently when the strainable bag is inverted and the liquid flows through the closure 150. In certain embodiments, the distance between adjacent hooks $D_1$ may be relatively large in comparison to the width $W_1$ of the track 152. For example, if the product 90 includes chunks of meat which are marinated and then the liquids are strained therefrom, $D_1$ may be larger than it would be for a product 90 which includes small pasta or rice grains with spices intended to be retained thereon after straining away, for example, water used to cook the pasta or rice.

In certain embodiments, the distance between adjacent hooks $D_1$ ranges from between about 1 mm to about 10 mm, between about 3 mm to about 8 mm, is at least about 2 mm, or is no more than about 10 mm.

In certain embodiments, the distance between adjacent hooks $D_1$ ranges from between about 3% of the width $W_1$ of the track 152 to about 50% of $W_1$, between about 5% of the width $W_1$ of the track 152 to about 40% of $W_1$, is at least about 3% of $W_1$, or is no more than about 40% of $W_1$.

In certain embodiments, the density of the hooks on the track ranges from between about 1 hook per $cm^2$ to about 120 hooks per $cm^2$, between about 5 hooks per $cm^2$ to about 80 hooks per $cm^2$, between about 10 hooks per $cm^2$ to about 50 hooks per $cm^2$, is at least about 1 hook per $cm^2$, or is no more than about 120 hooks per $cm^2$.

In certain embodiments, the hook-and-hook closure 150 acts as a tortuous path filter or a depth filter when used to strain liquids from the bag contents. Particles of various sizes may be either separated from or retained with the food product, as desired, after inverting the strainable bag 100 and allowing the liquid to pour out from the closure 150.

In certain embodiments, the mesh size of particles retained by the hook-and-hook closure 150 upon inversion of the strainable bag 100 ranges from between about 400 mesh to about 4 mesh, between about 300 mesh to about 10 mesh, or is at least about 300 mesh, or is no more than about 5 mesh.

In certain embodiments, gravity is used to separate any liquid from the non-liquid contents of the strainable bag 100.

FIGS. 16A-16B depict another embodiment of strainable bag 200 that can resemble the strainable bag 100 described above in certain respects. Accordingly, like features are designated with like reference numerals, with the leading digits incremented to "2." Relevant disclosure set forth above regarding similarly identified features thus may not be repeated hereafter. Moreover, specific features of the strainable bag 200 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the strainable bag 200. Any suitable combination of the features and variations of the same described with respect to the strainable bag 100 can be employed with the strainable bag 200, and vice versa. This method of disclosure is equally applicable to the strainable bags 300, 400, 500, 600 and 700, discussed below with respect to FIGS. 17A-21.

The strainable bag 200 may comprise a pinch-bottom arrangement. The strainable bag 200 may include a heat seal 241 at an upper end thereof and any suitable seal 231 (e.g., a heat seal) at a lower end thereof. A score line or notch 243 may be included at the top end of the bag 200. The bag 200 can include a hook-and-hook closure 250, such as those described above, which can close the top end of the bag for transport or storage, for example. In the illustrated embodiment, the strainable bag 200 may have the heat seal 241 removed by tearing at the score line 243 to thereafter provide a strainable bag with solely a hook-and-hook closure 250 (FIG. 16B) at the upper end thereof, which may be used for the various methods disclosed above (e.g., opening, closing, straining, etc.). In some embodiments, the pinch-bottom bag 200 includes a front wall 236 and a rear wall 234 without side walls.

A variety of other bag styles may be used. For example, in certain embodiments, the bag can comprise a gusseted pinch-bottom bag configuration, a non-gusseted pinch-bottom bag configuration, a flat bottom, a folded bottom, other various pinch-bottom bag configurations, a non-pinch straight heat sealed bottom, and various SOS (self-opening sack) configurations. The bag may be described as having a pouch configuration, in various embodiments.

Figure 17B:
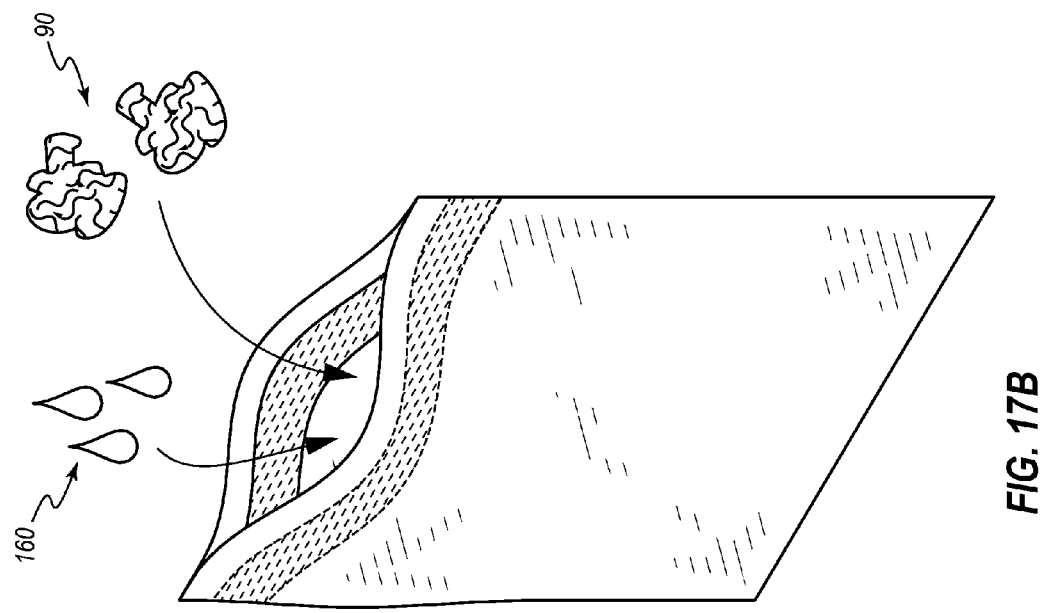
FIGS. 17A and 17B illustrate perspective views of another embodiment of a strainable bag.
Figure 17A:
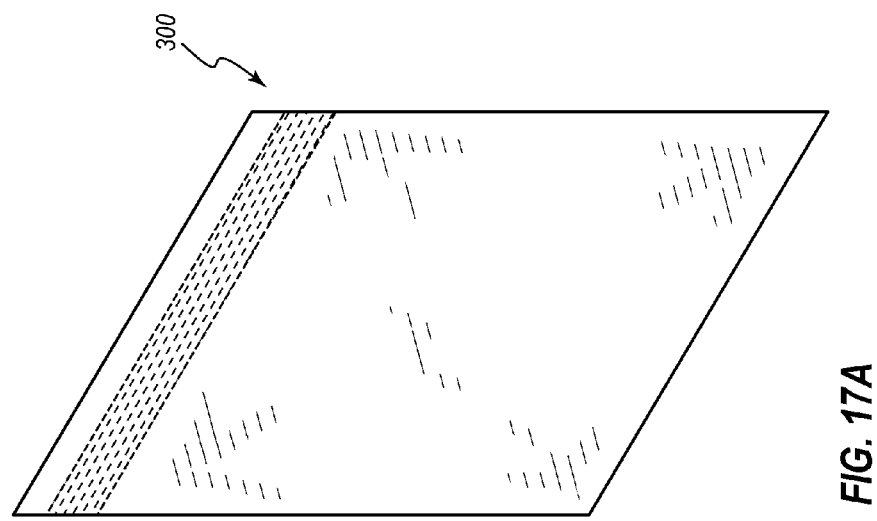

With reference to FIGS. 17A and 17B, an embodiment of a pouch-like strainable bag 300 is depicted. The strainable bag 300 may be initially empty (FIG. 17A) and a food product 90 and liquid 160 may be later added to the strainable bag (FIG. 17B). In certain embodiments, the top end of the strainable bag 100 may be sealed in a reclosable manner with a press-to-close seal or a zipper block and track system, in addition to a hook-and-hook closure 350.

Figure 18:
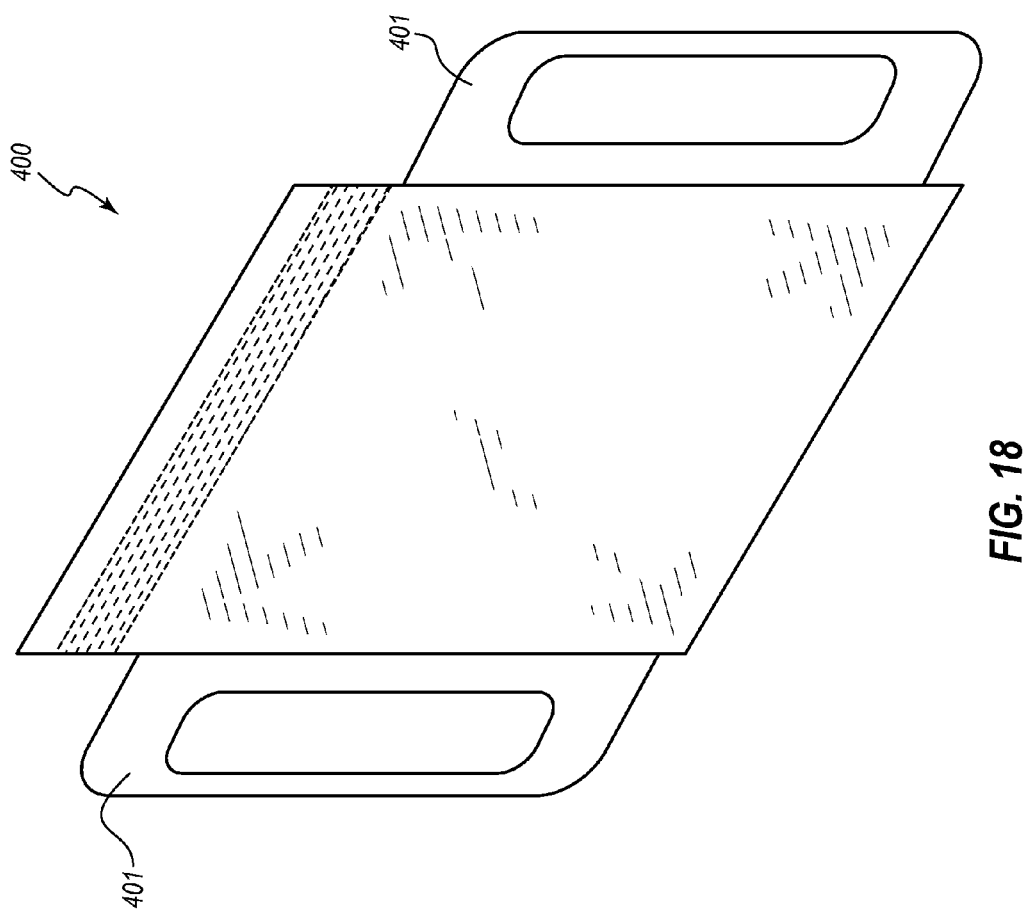
FIG. 18 illustrates a perspective view of a further embodiment of a strainable bag.

With reference to FIG. 18, in certain embodiments, a strainable bag 400 may include integrated handles 401. The strainable bag 400 may also incorporate an element such as expandable side gussets or a bowl-shaped bottom, for consumer convenience.

Figure 19:
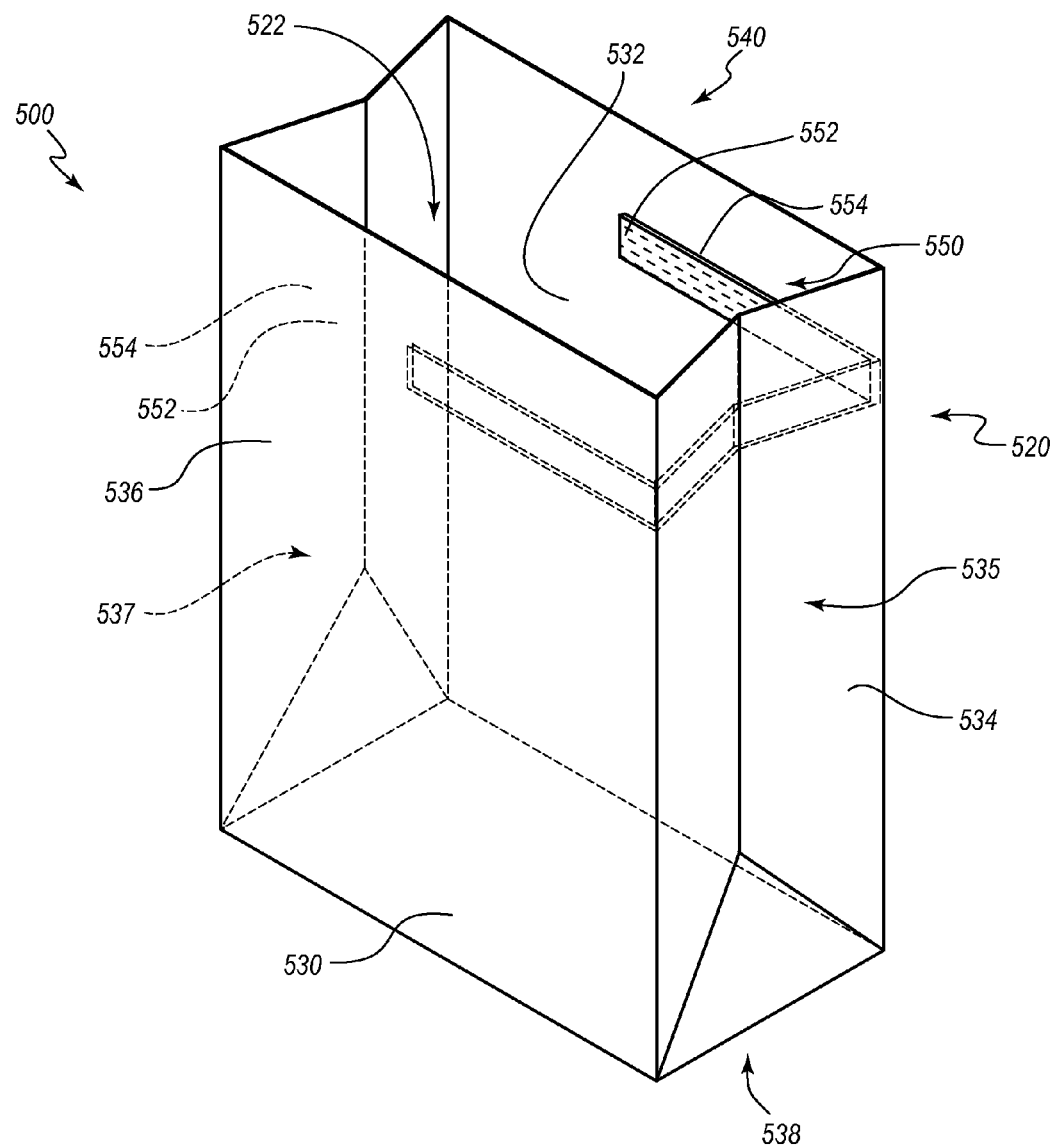
FIG. 19 illustrates a perspective view of a further embodiment of a strainable bag having a closed end and an open end with a hook-and-hook closure.

With reference to FIG. 19, a strainable bag 500 is depicted. The strainable bag 500 may, in certain embodiments, have a top end 540 that may be sealed in a reclosable manner with a hook-and-hook closure 550 that extends only partially around the perimeter of the tube body 520, including the gusseted side walls (e.g., the side walls 534, 536). The hook-and-hook closure 550 can extend along a first, second, and third wall in a substantially fixed state. When closed by the user, the hook-and-hook closure 550 can hold the front (or back) and side walls in close engagement with one another so as to form a substantially closed seal. The hook-and-hook track 552 can extend about at least a portion of the perimeter of the tube body such as the configuration of the embodiment of the tube body shown in FIG. 19 at 520. This may be advantageous for cost reasons, as it uses less of the hook-and-hook material than if it is extends around the full perimeter. A portion of the top end 540 may remain sealed and only, for example, half of the top end may be opened via a hook-and-hook closure 550 to apply a marinade or spices. After, for example, heating the bag 500, any liquid may be decanted and the top end 540 may be fully opened for access to the product within.

Figure 20:
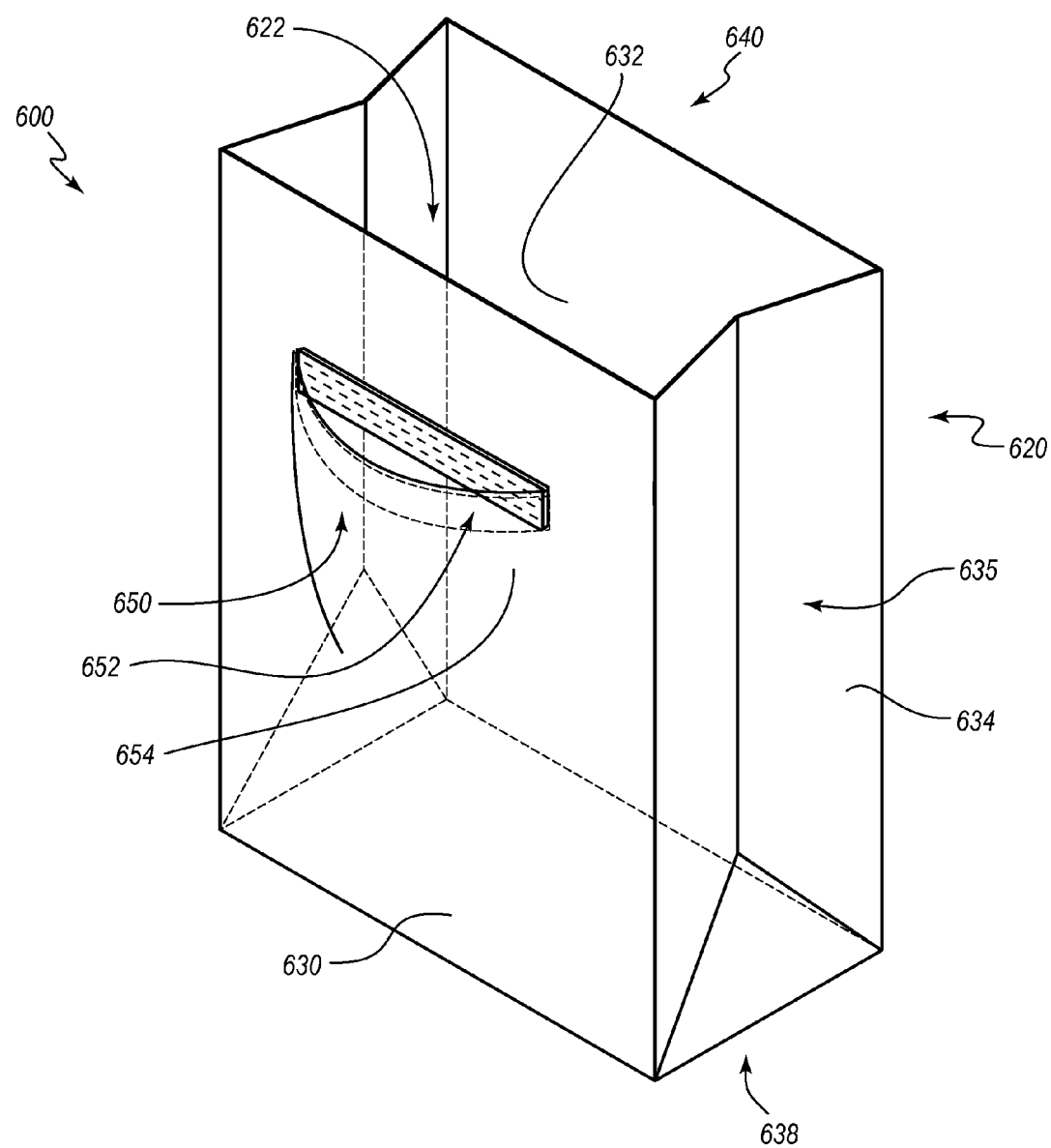
FIG. 20 illustrates a perspective view of a further embodiment of a strainable bag having a closed end and an open end with a hook-and-hook closure.

With reference to FIG. 20, in certain embodiments, a strainable bag 600 may include a hook-and-hook closure 650 of the strainable bag 600 which is not at the top 640 of the bag 600. Steam or other gases are able to be vented or released through the hook-and-hook closure 650, via the voids between the hooks. Any amount of liquid may be strained out of the bag 600 while retaining at least a majority of any non-liquid content within the bag by inverting the strainable bag 600 and allowing the liquid to pour out or drain between the hooks. The top end 640 may be fully closed during this process. The bag may then be opened at a top end 640 to access or expose the food product, for further processing or consumption. The hook-and-hook closure 650 of the strainable bag 600 may be closed for storage, as may top end 640. Top end 640 may include a reclosable seal, such as, for example, a zipper track. The hook-and-hook closure 650 of the strainable bag 600 may be pre-applied to the film roll stock and used, for example, in a form/fill/seal (FFS) line.

With reference to FIG. 21A and FIG. 21B, in certain embodiments, a strainable bag 700 may comprise a pinch-bottom arrangement. The strainable bag 700 may include a heat seal 741 at an upper end thereof and any suitable seal 731 (e.g., a heat seal) at a lower end thereof. The bag 700 can include a hook-and-hook closure 750, such as those described above, which can close a portion of the top end of the bag for straining. In the illustrated embodiment, the strainable bag 700 may have the upper heat seal 741 removed to thereafter provide a strainable bag with a hook-and-hook closure 750 (FIG. 21B) at a portion of the upper end thereof and a lower heat seal 741 extending across the bag end, which may be used for the various methods disclosed above (e.g., opening, closing, straining, etc.). The lower heal seal 741 may be added during insertion of the hook-and-hook closure 750, which is connected to the bag 700 via a heat sealant. In some embodiments, the pinch-bottom bag 700 includes a front wall 736 and a rear wall 734 without side walls. The bag 700 can include a hook-and-hook closure 750 which can be opened, used for straining, then closed for storage of the remaining contents.

In some embodiments, the walls of the strainable bag 100 can substantially block or serve as a barrier to elements such as, for example, grease, moisture, liquids or odors.

In certain embodiments, the material of which the body portion 120 of the strainable bag is formed can comprise an outer ply and an inner ply. In other embodiments, it may be of a single layer. In some embodiments, an inner face (e.g., an inwardly facing surface) of an outer ply is adhered to an outer face (e.g., an outwardly facing surface) of an inner ply. In further embodiments, the inner and outer plies can be in abutting contact. For example, the inner ply can be laminated to the outer ply, or the plies may be coextruded. In certain embodiments, the outer ply can comprise a polymeric film and a paper layer. In other embodiments, the components of the ply may each be polymeric.

As used herein, the term "film" refers to the material of which the body portion 120 of the strainable bag is formed, and may include both polymeric and paper components as discussed herein. The term "film" includes laminate, single-layer and multi-layer polymeric products, and may comprise a fiber product.

The plies or layers can be joined in any suitable fashion. For example, a polymeric film and a paper layer can be laminated, such as via adhesive lamination or extrusion lamination. A polymeric film can be adhered (e.g., in abutting contact) to an outer face of the paper layer via a tie layer. In various embodiments, the tie layer can comprise a solvent-based or solventless adhesive, a plastic-type bonding material, or a co-extruded film. In some embodiments, the tie layer comprises polyurethane. In further embodiments, the plies may comprise multiple laminated layers.

In certain embodiments, the adhesive may include a component selected from the group consisting of styrene-isoprene-styrene copolymers, styrene-butadiene-styrene copolymers, ethylene ethyl acrylate copolymers, polyurethane reactive adhesives, tackifiers, waxes, paraffin, antioxidants, plasticizers, plant sterols, terpene resins, polyterpene resins, turpentines, hydrocarbon resins, resin acids, fatty acids, polymerized rosins, rosin esters, and polyamide adhesives. The adhesive may be a hot melt adhesive, which can be solvent-free and is characteristically solid at temperatures below 180° F., are low viscosity fluids above 180° F., and rapidly set upon cooling.

Generally, these polymers may not exhibit the full range of performance characteristics that can be required for certain end products by themselves. For this reason, for example, a variety of tackifying resins, waxes, antioxidants, plasticizers, viscosity reducers, and other materials can be added to the adhesive formulation to enhance the polymer performance.

In certain embodiments, the material of which the body portion 120 of the strainable bag 100 is formed comprises polyethylene (PE). For example, in various embodiments, the film comprises polyethylene terephthalate (PET), polyethylene terephthalate polyester (PETP), polytrimethylene terephthalate (PTT), polybutylene terephthalate (PBT), polypropylene (PP), or polyamide (PA). PP films may be oriented or non-oriented, and may be woven. Certain films, such as some embodiments that comprise polyester (e.g., PETP), can be puncture-resistant, tear-resistant, scratch-resistant, grease-resistant, and/or absorption-resistant. These properties can aid in providing a bag with, and in maintaining, an aesthetically pleasing appearance.

In some embodiments, the polymeric film of the strainable bag 100 can include one or more materials configured to provide or enhance the moisture-resistance or other barrier properties of the film. For example, in some embodiments, the film can be resistant to or substantially impermeable to mineral oils, solvents, and acids. The film can include, for example, a plastic, polyvinyl chloride (PVC), polystyrene (PS), a metalized film, ethylene vinyl alcohol, polyester, polyamide or specialty resins. In certain embodiments, the film can comprise linear low density polyethylene or metallocine. Other materials known to a skilled artisan are also possible.

In some embodiments, the grease-resistant materials provide resistance to and/or prevention of the penetration or absorption of grease, mineral oils, solvents, and/or acids.

In certain embodiments, the film of the strainable bag 100 comprises polypropylene. In various embodiments, the polypropylene can exhibit relatively high grease-resistance, rigidity, translucence, chemical resistance, toughness, fatigue resistance, integral hinge properties, and/or heat resistance. Various forms of polypropylene are possible, and may be selected based on particular needs and cost considerations. In certain embodiments, the film of the strainable bag 100 comprises nylon. The nylon can have such properties as relatively high wear and abrasion resistance, relatively high strength, and/or a relatively high modulus (e.g., modulus of elasticity).

In some embodiments, the film of the strainable bag 100 exhibits a high degree of puncture resistance. This property can also be advantageous depending on the type of product 90 stored in a strainable bag 100. For example, in some embodiments, the product 90 can be relatively abrasive such that the inner ply is desirably capable of withstanding the formation of pinholes during transportation and/or use of the strainable bag 100.

In some embodiments, the film of the strainable bag 100 exhibits a high modulus (e.g., modulus of elasticity) such that it is able to elastically stretch. Such a film can provide the strainable bag 100 with resiliency, which can help to prevent rips, tears, or punctures.

In certain embodiments, the film of the strainable bag 100 includes a multi-layer film or laminate. For example, in some embodiments, the film comprises four or more co-extruded layers or five or more co-extruded layers. A core layer can be positioned at a center of the film in some embodiments, and in other embodiments, can be at an off-centered position.

One or more of a core layer and/or other layers of the film of the strainable bag 100 can comprise any suitable combination of the materials discussed above with respect to a single-layer ply. In some embodiments, the core layer comprises nylon or polypropylene. In other embodiments, the core layer can comprise a metalized film, ethylene vinyl alcohol, polyester, or a specialty resin. In some embodiments, the core layer is substantially grease-proof, is highly puncture resistant, and/or comprises a high modulus.

The film may comprise homopolymers, block copolymers, or random copolymers.

In certain embodiments, the outer layer of the film comprises a polymeric layer. For example, it may comprise polyethylene, polyethylene terephthalate (PET), polyamide or oriented polypropylene.

In certain embodiments, one or more of the components of the film of the strainable bag 100 may be heat-sealable, which may be advantageous for certain uses of the bag or in certain manufacturing procedures used to construct the bag. For example, one or more of the components of the film can be configured to advantageously melt and closingly seal at least one of the bag ends 138, 140 in response to the application of heat. As another example, in some embodiments, an inner film that is heat-sealable can advantageously be coupled to a hook-and-hook closure 150 via the connecting portion 154. For example, in an embodiment, the inner ply or innermost component of the film may comprise polyolefin. In certain embodiments, it comprises a heat-sealable polyethylene (PE) or oriented polypropylene (OPP). In some embodiments, the core layer can be heat-sealable.

In some embodiments, the thickness of the film can range from about 1 mil to about 6 mil. In an embodiment, the film can range from about 2 mil to about 5 mil. In other embodiments, the film can be about 1 mil, about 6 mil, no more than about 0.5 mil, or no less than about 10. The film, however, can have other thicknesses for other applications, as needed or desired.

In certain embodiments, the outer layer of the film can be treated with a coating. The coating can protect against abrasion of the film, and may provide an aesthetically appealing gloss finish. In some embodiments, the coating can facilitate adhesion and bonding and can increase a coefficient of friction of the bag. In some embodiments, the coating can include printed indicia, which can be surface printed or reverse printed. Procedures for printing indicia can include process printing, rotogravure printing, and innovative flexographic printing. In various embodiments, the coating can comprise, for example, a flexography coating, a proprietary coating, or any other suitable coating.

In certain embodiments, the film can be amorphous, which is a classification indicating that it is highly transparent and colorless, or can be semi-crystalline, which is a classification indicating that it is translucent or opaque with an off-white coloring, or mixtures of both an amorphous and a semi-crystalline component. In some embodiments, a film can be printed with solvent-based inks or water based inks, and can be printed overall with a flood coat of white ink, which may advantageously allow for high-quality graphics.

In other embodiments, the film can be unprinted (e.g., the film can be substantially plain and/or clear). The film can provide a strainable bag 100 with a superior appearance, as compared with, for example, standard convenience food bags. For example, a printing on the film can be more aesthetically pleasing than similar printing applied to bags that do not have an outer film.

In certain embodiments, film of the strainable bag 100 can exhibit a bending stiffness, modulus, and/or tensile stiffness that is larger than that of a polymeric layer, due to the incorporation of one or more paper layers. In certain embodiments, the paper layer can be thicker than the polymeric layers of the film. In other embodiments, a polymeric layer may be optimized to provide sufficient stiffness and used in the film.

In some embodiments, the film of the strainable bag can provide sufficient structural rigidity to permit the strainable bag 100 to be placed in and remain in an upright position. For example, the strainable bag 100 might contain a product 90 in an amount sufficient to fill only a fraction (e.g., ¼, ⅓, ½) of the bag. In certain of such embodiments, the product 90 can be settled at the bottom end of the bag, and the bag can be set upright on its bottom end. Although the product 90 does not generally support the top end 140 of the bag 100 in such a configuration, the bag 100 can nevertheless remain in a substantially upright configuration, and can resist gravitational force acting on the top end 140 of the bag 100 due to the stiffness of the film.

As used herein, the term "stiffness" is a broad term used in its ordinary sense, and can include bending stiffness or tensile stiffness. Other suitable measurements of stiffness can also be utilized, such as droop stiffness, folding endurance, or other alternative measurements. In certain instances, bending stiffness represents the rigidity of a film. In some cases, the bending stiffness of an item can be a function of (e.g., can be proportional to) the cube of the caliper thickness of the item. Bending stiffness can also be related to the modulus of elasticity of the item. In many embodiments, the bending stiffness of a film generally increases as the thickness of the layers is increased.

Various instruments may be used to measure stiffness, many of which determine the stiffness of an item by subjecting it to bending of one variety or another. For example, some instruments employ TAPPI 2-point bending, while others employ TAPPI 4-point bending. Suitable instruments for measuring bending stiffness can include Taber, Gurley, and L&W instruments.

In many embodiments, the stiffness of the film, or a specific layer or group of layers within the film, is selected such that the material of which a strainable bag 100 is ultimately formed can be laminated on existing machinery. Likewise, in many embodiments, the stiffness of the film, or a specific layer or group of layers within the film, is selected such that the material can be formed into the bag 100 on existing converting equipment.

In certain embodiments, the film, or a specific layer or group of layers within the film, can advantageously enhance the durability of a bag 100. Various basis weights of paper can be utilized in embodiments comprising a paper layer, for example, ranging from about 30 pound-force/inch to about 50 pound-force/inch, as these units are understood by those skilled in the art. In other embodiments, the paper can be in a range between about 20 pounds per 3,000 square feet and about 80 pounds per 3,000 square feet. Embodiments of the paper layer can be coated (e.g., clay-coated) and/or bleached, or in other embodiments, can be manufactured without coating or bleach.

Each of the materials used to construct the strainable bag 100 may have a different range of melting temperatures. For example, in some embodiments, a polymeric film of the outer ply has a melting point temperature greater than a heat-sealable film of the inner ply. In one embodiment, the polymeric film of the outer ply has a melting temperature in the range of about 300° F. to about 475° F., and may be greater than 425° F. In one embodiment, the heat-sealable film of the inner ply has a melting point temperature in the range of about 220° F. to about 300° F., and may be greater than 300° F. As understood by those skilled in the art, the polymeric heat-sealable film of the inner ply has a lower melting temperature and therefore melts easier and at lower temperatures than the polymeric film of the outer ply. A sufficiently low melting point temperature for a heat-sealable polymer comprising the inner ply advantageously allows for the its melting and bonding to, for example, closingly seal the bag end 138, 140 or to adhere to the hook-and-hook closure track 152.

In an embodiment, the materials used to the construct the strainable bag 100 can withstand exposure to a heat source, such as a microwave oven. Other heat sources include a standard oven, a convection oven, hot or boiling water or steam either as a bath to place the bag into, or to add directly to the interior of the bag; and an infrared heat source. In certain embodiments, the heat resistance of the film, or a specific layer or group of layers within the film, has been optimized for a specific intended heat source, such as a microwave oven. In other embodiments, there may be little heat resistance of the film, such as when the strainable bag is intended for non-heating applications, such as marinating.

Certain embodiments of strainable bags 100 and methods discussed herein can have important benefits and advantages. The use of both polymeric materials and paper within the films, for example, can combines the advantages of the thickness and bending stiffness of paper with the puncture-resistant and grease-resistant properties of a polymer, including in some embodiments, heat-sealable characteristics. In certain embodiments, these advantages may be achieved with the use of optimized polymeric materials. Embodiments of a strainable bag 100 can provide increased barrier protection from grease, endurance, strength, stiffness or rigidity, physical integrity, heat resistance, and heat-sealable characteristics not offered with other bags.

The ability of the strainable bags to vent gases and strain liquids, such as water, without the need for additional equipment, is also advantageous. Additionally, the strainable bags may prevent problems customarily associated with specific food products, such as raw meat or eggs.

The strainable bag 100, significantly, can include side gussets which may be substantially closed and subsequently opened and re-closed, without requiring precise alignment of the hook-and-hook tracks. Further, embodiments of a strainable bag 100 may emit a sound when the hook-and-hook closure is disengaged, enhancing the consumer experience and indicating opening of the bag. The strainable bag 100 can withstand exposure to fine particles from product 90 or added product, and retain the ability to open, reclose and strain. Other applications of the bag 100 may include the preparation of dried or dehydrated foods or beverages.

In some embodiments, materials used in constructing the strainable bag can be environmentally friendly, in that the resulting bag is less toxic and increasingly biodegradable. Further, in some embodiments, a bag can advantageously be manufactured on existing equipment, such that investment in new and expensive bag manufacturing equipment is unnecessary.

As discussed above, a variety of bag styles are possible. For example, in various embodiments, the strainable bag can comprise a gusseted pinch-bottom bag configuration, a non-gusseted pinch-bottom bag configuration, a pillow style bag or pouch configuration, a flat bottom, a folded bottom, other various pinch-bottom bag configurations known to a skilled artisan, a non-pinch straight heat sealed bottom, and various SOS (self-opening sack) configurations. In certain embodiments, the strainable bag can comprise a full open mouth configuration for ease of filling and ease of dispensing product.

In certain embodiments, the strainable bag is configured to contain an amount of product in the cavity ranging from about 6 ounces to about 10 pounds. In other embodiments, the strainable bag may contain an amount of product ranging from about 8 ounces to about 8 pounds, or no more than about 6 ounces, or no less than about 10 pounds of product. In certain embodiments, the strainable bag contains no product and may be intended for at-home food preparation use.

In an embodiment, the bag is configured for food preparation, and includes a tube body that defines a front wall, a back wall, a top end and a bottom end, wherein the front and back walls and the top and bottom ends define at least a portion of a cavity that is configured to receive a food product therein, wherein the front wall and the back wall at least partially define an opening into the cavity; and a hook-and-hook closure element that is configured to transition between an open orientation and a closed orientation, wherein the hook-and-hook closure element is attached around at least a portion of the perimeter of the tube body at the top end of the tube body, wherein the tube body is configured to be sealed such that the cavity is entirely enclosed after a food product has been introduced therein, and subsequently unsealed so as to permit access to the food product, and wherein an end of the bag that is closest to the hook-and-hook closure is configured to be unsealed without affecting the ability of the hook-and-hook closure to transition between the open and closed orientations, and wherein the hook-and-hook closure, when in the closed orientation, is configured to permit liquid to be strained out of the bag through the hook-and-hook closure while retaining at least a majority of a non-liquid portion of a food product within the bag.

In a further embodiment, an end of the bag that is closest to the hook-and-hook closure may be configured to be unsealed without affecting the ability of the hook-and-hook closure to transition between the open and closed orientations.

In an embodiment, there may be a second seal at the end of the tube body that is opposite the first seal. In certain embodiments, the bag comprises a first sidewall that extends between the front and back wall; and a second sidewall that extends between the front and back wall, wherein the bottom end of the tube body defines a base at the lower ends of the first and second sidewall and the front and back wall.

The strainable bag may also include instructions for use, wherein the instructions direct a user of the bag to: open an end of the bag that is closest to the hook-and-hook closure; transition the hook-and-hook closure to the closed orientation while a food product is within the cavity of the bag; and drain fluid from the food product through the hook-and-hook closure that is in the closed orientation. Such an embodiment may be useful when the manufacturer of the bag is not the same company which inserts food product into the bags. In an embodiment, the instructions 370 may be printed on a surface of the tube body 320 (see e.g., FIGS. 17A-17B). In certain embodiments, an insert 272 comprises the instructions 270, and the insert 272 may be positioned within the cavity 222 of the tube body 220 (see e.g. FIGS. 16A-16B).

Advantages of the disclosed methods include the ability to prepare foods without requiring additional dishes or cooking vessels. In certain embodiments, food can be prepared without necessitating the user to touch or expose the food to kitchen or dining surfaces, which is important for health, for example, when using raw meat or raw eggs. Food preparation is also fast and convenient using the methods disclosed herein.

In an embodiment, a method of using a strainable bag to prepare food comprises: obtaining a strainable bag that defines a cavity, wherein the bag comprises: a hook-and-hook closure, at least one end that comprises a liquid-tight seal, and a food product positioned within the cavity; unsealing the liquid-tight seal so as to expose the food product; processing the food product; closing the hook-and-hook closure such that the food product is maintained within the cavity; orienting the bag so as to allow at least a majority of any liquid inside the bag to drain from the food product through the closed hook-and-hook closure; and opening the hook-and-hook closure to expose the drained food product. Such a method is amenable to a situation wherein the bag is manufactured by, for example, a packaging manufacturer, then transferred to a different company which adds the food product, then provides it to the final consumer.

In a further embodiment, the method may additionally include removing a portion of the food product through both the opened hook-and-hook closure and the opened liquid-tight seal. In an embodiment, the hook-and-hook closure may be adjacent to the at least one sealed end, which may be a heat seal and which may be reclosable. The method may also further include leaving another portion of the drained food product within the cavity of the bag and reclosing the liquid-tight seal so as to preserve the portion of the drained food product that is within the cavity for future use.

In certain embodiments, a method of manufacturing food packaging includes: providing a bag that comprises a first end and a second end opposite the first end, wherein the bag comprises a cavity between the first and second ends, and wherein the bag further comprises a hook-and-hook closure that is configured to transition between an open orientation and a closed orientation so as to respectively permit and inhibit access to the cavity; introducing a food product into the cavity via the first end of the bag; and sealing the first end of the bag such that the food product is hermetically sealed within the cavity.

In further embodiments, such methods may include a hook-and-hook closure being in a closed orientation when the bag is provided, and wherein the hook-and-hook closure prevents the food product from contacting the second end of the bag after the food product has been introduced into the bag. In this situation, the bag may include instructions for using the bag, wherein the instructions direct a user of the bag to: open the second end of the bag so as to provide access to the food product; process the food product; transition the hook-and-hook closure to the closed orientation while the food product is within the cavity of the bag; and drain fluid from the food product through the hook-and-hook closure while it is in the closed orientation.

Further, the instructions may be printed on a surface of the bag, or an insert comprises the instructions, and wherein the insert may be positioned within the cavity of the bag.

EXAMPLES

An approximately 0.5 mil layer of PET was prepared and reverse printed and laminated to approximately 4.0 mil layer of PE. The PET and PE were laminated to each other via a solventless adhesive. The multi-layer, laminated material is then converted to strainable bags on upgraded converting equipment.

The hook-and-hook track has PE ribs on its flanges, which were heat sealed via heat seal bars onto the PE of the inner ply of the laminate when it was a flat web. The hook-and-hook closure was formed with T-shaped, or mushroom-shaped, appendages. Modified equipment was used to pull the track across the web to be heat sealed. The equipment was modified to handle a track format, such that the track can be pre-mated or handled open and joined prior to insertion into the package to be heat sealed. The thickness of the track was approximately 2 mm. The flat web was formed into a tube with forming plates and subsequently heat sealed on all four longitudinal edges. Then, the heat seal was applied at the bottom end of the bag, along with miter seals, to close the bag and form the bottom. The bottom of the bag may be left with a bottom seal only, or the bottom can be folded face to back and a hot melt applied, to provide a pinched end. In this Example, the bag was 8 inches wide, had no gusset, and was 18 inches long (finished length) with a pillow style bottom. The strainable bag was designed to hold about 6 lbs of food.

In a smaller pouch format, a 7-inch by 6-inch pouch was formed with one end open, a hook-and-hook closure was inserted and the pouch was heat sealed 1.5 inches from the top of the pouch to incorporate the closure. One cup of frozen peas were placed in the pouch and the closure was mated to maintain closure but the top was not additionally heat sealed. The pouch was microwaved in a commercial 850 watt microwave for 3.5 minutes on high. The package vented well and when the cook cycle was completed, the package was removed and all free liquid was drained from the pouch without opening the hook-and-hook closure, by turning the package upside down and decanting the liquid. After decanting the liquid, the package was placed on the counter with the closure at the top of the package, and the closure was then opened to give access to the drained food product.

Various modifications, changes, and variations apparent to those of skill in the art may be made in the arrangement, operation, and details of the apparatus and methods detailed in the disclosure without departing from the spirit and scope of the disclosure. Thus, it is to be understood that the embodiments described above have been presented by way of example, and not limitation. Any suitable combination of the features described above is contemplated. Moreover, each embodiment recited in the claims that follow is incorporated herein as a separate embodiment.

The invention claimed is:

1. A strainable bag configured for food preparation, the bag comprising:
   a tube body that defines a front wall, a back wall, a top end and a bottom end, wherein the front and back walls and the top and bottom ends define at least a portion of a cavity that is configured to receive a food product therein, wherein the front wall and the back wall at least partially define an opening into the cavity; and
   a hook-and-hook closure element that is configured to transition between an open orientation and a closed orientation, wherein the hook-and-hook closure element is attached around at least a portion of the perimeter of the tube body at the top end of the tube body, wherein the hook-and-hook closure element comprises hooks, wherein the tube body is configured to sealed such that the cavity is entirely enclosed after a food product has been introduced therein, and subsequently unsealed so as to permit access to the food product, wherein an end of the bag that is closest to the hook-and-hook closure is configured to be unsealed without affecting the ability of the hook-and-hook closure to transition between the open and closed orientations, wherein the hook-and-hook closure, when in the closed orientation, is configured to permit liquid to be strained out of the bag through the hook-and-hook closure while retaining at least a majority of a non-liquid portion of a food product within the bag, wherein the bag further comprises instructions for using the bag, wherein the instructions are printed on a surface of the body, or an insert comprises the instructions, wherein the insert is positioned within the cavity of the tube body, wherein the instructions direct a user of the bag to:
open an end of the bag that is closest to the hook-and-hook closure;
transition the hook-and-hook closure to the closed orientation while a food product is within the cavity of the bag; and
drain fluid from the food product through the hook-and-hook closure that is in the closed orientation.

2. The bag of claim 1, further comprising a second seal at the end of the tube body that is opposite the first seal.

3. The bag of claim 1, further comprising:
a first sidewall that extends between the front and back wall; and
a second sidewall that extends between the front and back wall,
wherein the bottom end of the tube body defines a base at the lower ends of the first and second sidewall and the front and back wall.

4. The bag of claim 3, further comprising at least one gusset.

5. The bag of claim 1, wherein the density of the hooks on the track ranges from between about 1 hook per $cm^2$ to about 120 hooks per $cm^2$.

6. The bag of claim 1, wherein the hook-and-hook closure has a track width of between about 5 mm to about 50 mm.

7. The bag of claim 6, wherein the distance between adjacent hooks is between about 3% of the width of the track to about 30% of the width of the track.

8. The bag of claim 1, wherein the hooks have a thickness of between about 0.25 mm to about 5.0 mm.

9. The bag of claim 1, wherein the distance between adjacent hooks is between about 1 mm to about 10 mm.

10. The bag of claim 1, wherein the hook-and-hook closure is configured such that the mesh size of particles retained by the closure upon inversion of the bag ranges from between about 300 mesh to about 10 mesh.

11. The bag of claim 1, wherein the hook-and-hook closure can be reclosed.

12. The bag of claim 1, wherein the hooks are T-shaped or mushroom-shaped.

13. The bag of claim 1, wherein the hooks are hook-shaped.

14. A strainable comprising:
a tube body that defines a front wall, a back wall, a top end and a bottom end, wherein the front and back walls and the top and bottom ends define at least a portion of a cavity that is configured to receive a food product therein, wherein the front wall and the back wall at least partially define an opening into the cavity; and
a hook-and-hook closure element that is configured to transition between an open orientation and a closed orientation, wherein the hook-and-hook closure element is attached around at least a portion of the perimeter of the tube body at the top end of the tube body, wherein the hook-andhook closure element comprises hooks, wherein the tube body is configured to sealed such that the cavity is entirely enclosed after a food product has been introduced therein, and subsequently unsealed so as to permit access to the food product, wherein the hook-and-hook closure element is attached around at least a portion of the perimeter of the tube body at the top end of the tube body, wherein the hook-and-hook closure element is configured to act as a tortuous path filter for straining a liquid from non-liquid contents of the bag, wherein the bag further comprises instructions for using the bag, wherein the instructions are printed on a surface of the tube body, or an insert comprises the instructions, wherein the insert is positioned within the cavity of the tube body, wherein the instructions direct a user of the bag to:
open an end of the bag that is closest to the hook-and-hook closure;
transition the hook-and-hook closure to the closed orientation while a product is within the cavity of the bag; and
drain fluid from the product through the hook-and-hook closure that is in the closed orientation.

15. The bag of claim 14, further comprising a second seal at the end of the tube body that is opposite the first seal.

16. The bag of claim 14, further comprising:
a first sidewall that extends between the front and back wall; and
a second sidewall that extends between the front and back wall,
wherein the bottom end of the tube body defines a base at the lower ends of the first and second sidewall and the front and back wall.

17. The bag of claim 16, further comprising at least one gusset.

18. The bag of claim 14, wherein the density of the hooks on the track ranges from between about 1 hook per $cm^2$ to about 120 hooks per $cm^2$.

19. The bag of claim 14, wherein the hook-and-hook closure has a track width of between about 5 mm to about 50 mm.

20. The bag of claim 14, wherein the distance between adjacent hooks is between about 3% of the width of the track to about 30% of the width of the track.

21. The bag of claim 14, wherein the hooks have a thickness of between about 0.25 mm to about 5.0 mm.

22. The bag of claim 14, wherein the distance between adjacent hooks is between about 1 mm to about 10 mm.

23. The bag of claim 14, wherein the hook-and-hook closure is configured such that the mesh size of particles retained by the closure upon inversion of the bag ranges from between about 300 mesh to about 10 mesh.

24. The bag of claim 14, wherein the hook-and-hook closure can be reclosed.

25. The bag of claim 14, wherein the hooks are T-shaped or mushroom-shaped.

26. The bag of claim 14, wherein the hooks are hook-shaped.

27. A strainable bag the bag comprising:
a tube body that defines a front wall, a back wall, a top end and a bottom end, wherein the front and back walls and the top and bottom ends define at least a portion of a cavity that is configured to receive a food product therein, wherein the front wall and the back wall at least partially define an opening into the cavity; and
a hook-and-hook closure element that is configured to transition between an open orientation and a closed orientation,
wherein the tube body is configured to be sealed such that the cavity is entirely enclosed after a product has been introduced therein, and subsequently unsealed so as to permit access to the product,
wherein the hook-and-hook closure, when in the closed orientation, is configured to permit liquid to be strained out of the bag through the hook-and-hook closure while retaining at least a majority of a non-liquid portion of a product within the bag, and
wherein the bag further comprises instructions for using the bag, wherein the instructions are printed on a surface of the tube body, or an insert comprises the instructions, wherein the insert is positioned within the cavity of the tube body,
wherein the instructions direct a user of the bag to:
  transition the hook-and-hook closure to the closed orientation while a product is within the cavity of the bag; and
  drain fluid from the product through the hook-and-hook closure that is in the closed orientation.

28. The bag of claim 27, wherein the hooks are T-shaped or mushroom-shaped.

29. A strainable bag, comprising:
a tube body that defines a front wall, a back wall, a top end and a bottom end, wherein the front and back walls and the top and bottom ends define at least a portion of a cavity that is configured to receive a product therein; and
a hook-and-hook closure element that is configured to transition between an open orientation and a closed orientation,
wherein the hook-and-hook closure element is configured to act as a tortuous path filter for straining a liquid from non-liquid contents of the bag, and
wherein the bag further comprises instructions for using the bag, wherein the instructions are printed on a surface of the tube body, or an insert comprises the instructions, wherein the insert is positioned within the cavity of the tube body,
wherein the instructions direct a user of the bag to:
  transition the hook-and-hook closure to the closed orientation while a product is within the cavity of the bag; and
  drain liquid from the product through the hook-and-hook closure that is in the closed orientation.

30. The bag of claim 29, wherein the hooks are T-shaped or mushroom-shaped.

* * * * *